US010733987B1

(12) United States Patent
Govender et al.

(10) Patent No.: US 10,733,987 B1
(45) Date of Patent: Aug. 4, 2020

(54) SYSTEM AND METHODS FOR PROVIDING UNPLAYED CONTENT

(71) Applicant: Amazon Technologies, Inc., Seattle, WA (US)

(72) Inventors: Saigin Govender, Seattle, WA (US); Jeff Gour, Seattle, WA (US); Daren Gill, Concord, MA (US); Rajat Chaturvedi, Bellevue, WA (US); Vishwanathan Krishnamoorthy, Lexington, MA (US); Ryan Elliott, Seattle, WA (US); Maoxiong Xu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/716,439

(22) Filed: Sep. 26, 2017

(51) Int. Cl.
*G06F 3/16* (2006.01)
*G10L 17/06* (2013.01)
*G10L 17/22* (2013.01)
*G10L 17/00* (2013.01)
*G10L 15/30* (2013.01)
*G10L 15/22* (2006.01)
*G10L 15/18* (2013.01)
*G10L 13/04* (2013.01)

(52) U.S. Cl.
CPC ............ *G10L 15/22* (2013.01); *G06F 3/165* (2013.01); *G10L 13/043* (2013.01); *G10L 15/1815* (2013.01); *G10L 17/005* (2013.01); *G10L 17/06* (2013.01); *G10L 17/22* (2013.01); *G10L 15/30* (2013.01); *G10L 2015/223* (2013.01)

(58) Field of Classification Search
CPC ....... G10L 15/00; G10L 15/26; G10L 15/265; G06F 17/30; G06F 17/00; G06F 3/00; G06F 3/16
See application file for complete search history.

(56) References Cited

U.S. PATENT DOCUMENTS 9,147,054 B1 * 9/2015 Beal .................. G06F 21/32
2003/0007640 A1 * 1/2003 Harada ............... G06F 21/10
380/270

(Continued)

FOREIGN PATENT DOCUMENTS

EP          3109858 B1    12/2016

OTHER PUBLICATIONS

International Search Report and Written Opinion for Application No. PCT/US2018/052123, dated Jan. 2, 2019.

(Continued)

*Primary Examiner* — Paras D Shah
(74) *Attorney, Agent, or Firm* — Pierce Atwood LLP

(57) ABSTRACT

Systems, methods, and devices related to providing content items from a collection of content items. The embodiments disclosed enhance user experience by keeping track of which content items were already played to a user, and skipping those content items automatically. The embodiments disclosed herein also can enable a user to limit playing of content items to those that have been added since the last time contents items from the collection of content items were played. If the user selects to receive additional content items after receiving the newly added items, the system can provide the older unplayed content items after the newly added content news items have been played.

16 Claims, 10 Drawing Sheets

(56) References Cited

U.S. PATENT DOCUMENTS

| | | | | |
|---|---|---|---|---|
| 2004/0006541 A1* | 1/2004 | Huddelston | G06Q 30/06 | 705/51 |
| 2006/0020662 A1* | 1/2006 | Robinson | G06F 15/16 | 709/203 |
| 2007/0244984 A1* | 10/2007 | Svendsen | H04L 67/06 | 709/217 |
| 2007/0256021 A1* | 11/2007 | Prager | G11B 27/034 | 715/744 |
| 2010/0064218 A1* | 3/2010 | Bull | G06F 3/167 | 715/716 |
| 2010/0198400 A1* | 8/2010 | Pascal | G07F 9/02 | 700/232 |
| 2010/0269145 A1* | 10/2010 | Ingrassia | H04H 20/24 | 725/110 |
| 2010/0324704 A1* | 12/2010 | Murphy | G06Q 10/10 | 700/94 |
| 2011/0208616 A1* | 8/2011 | Gorman | G06Q 30/0641 | 705/27.1 |
| 2011/0234480 A1* | 9/2011 | Fino | G11B 27/005 | 345/156 |
| 2012/0059910 A1* | 3/2012 | Cassidy | G06F 17/30029 | 709/219 |
| 2012/0117026 A1* | 5/2012 | Cassidy | G06F 16/4387 | 707/634 |
| 2013/0086474 A1* | 4/2013 | Oliver | G06F 17/30053 | 715/716 |
| 2013/0174035 A1* | 7/2013 | Grab | H04N 21/4316 | 715/716 |
| 2013/0290110 A1 | 10/2013 | Luvogt | | |
| 2015/0127340 A1* | 5/2015 | Epshteyn | G10L 15/26 | 704/235 |
| 2015/0172262 A1 | 6/2015 | Ortiz, Jr. | | |
| 2015/0286461 A1* | 10/2015 | Trammell | H04L 67/22 | 700/94 |
| 2015/0355818 A1* | 12/2015 | Corbin | G06F 3/04842 | 715/716 |
| 2016/0088036 A1* | 3/2016 | Corbin | H04L 65/4069 | 705/14.6 |
| 2016/0240212 A1* | 8/2016 | Wilson | H04S 3/008 | |
| 2016/0379644 A1* | 12/2016 | Li | G06F 21/32 | 704/273 |
| 2019/0087152 A1* | 3/2019 | Aggarwal | G06F 9/453 | |

OTHER PUBLICATIONS

International Preliminary Report on Patentability for Application No. PCT/US2018/052123, dated Apr. 9, 2020.

* cited by examiner

SYSTEM AND METHODS FOR PROVIDING UNPLAYED CONTENT

BACKGROUND

Electronic devices, such as audio (e.g., voice) controlled electronic devices, are capable of performing various functions. For instance, an individual may speak a command to activate such a device and in response, the device or other system component(s) may perform various functions and/or cause one or more actions to be performed. Some voice-controlled electronic devices may also include display screens capable of outputting content.

DETAILED DESCRIPTION

Figure 1A:
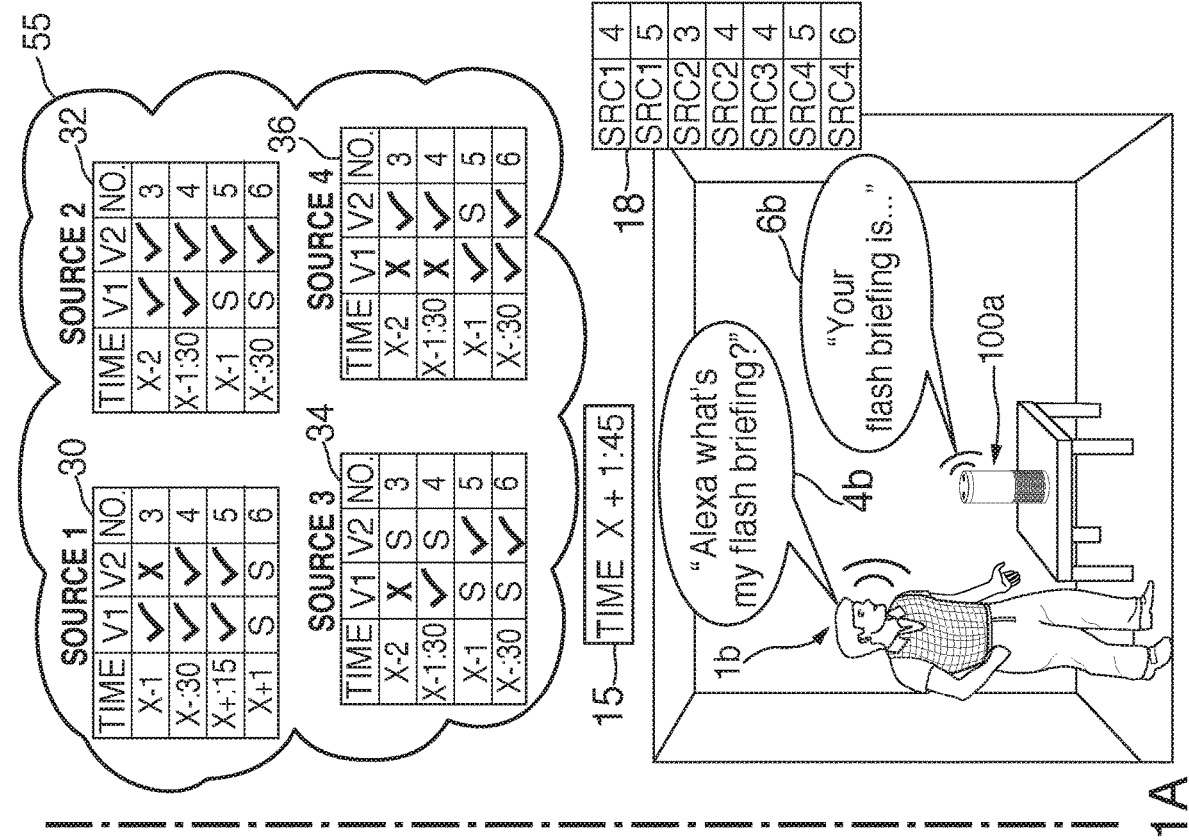
FIGS. 1A and 1B are illustrative diagrams of an exemplary system for keeping track of content for two different users that has been played, and for providing additional content that has yet to be played, in accordance with various embodiments.
Figure 1A:
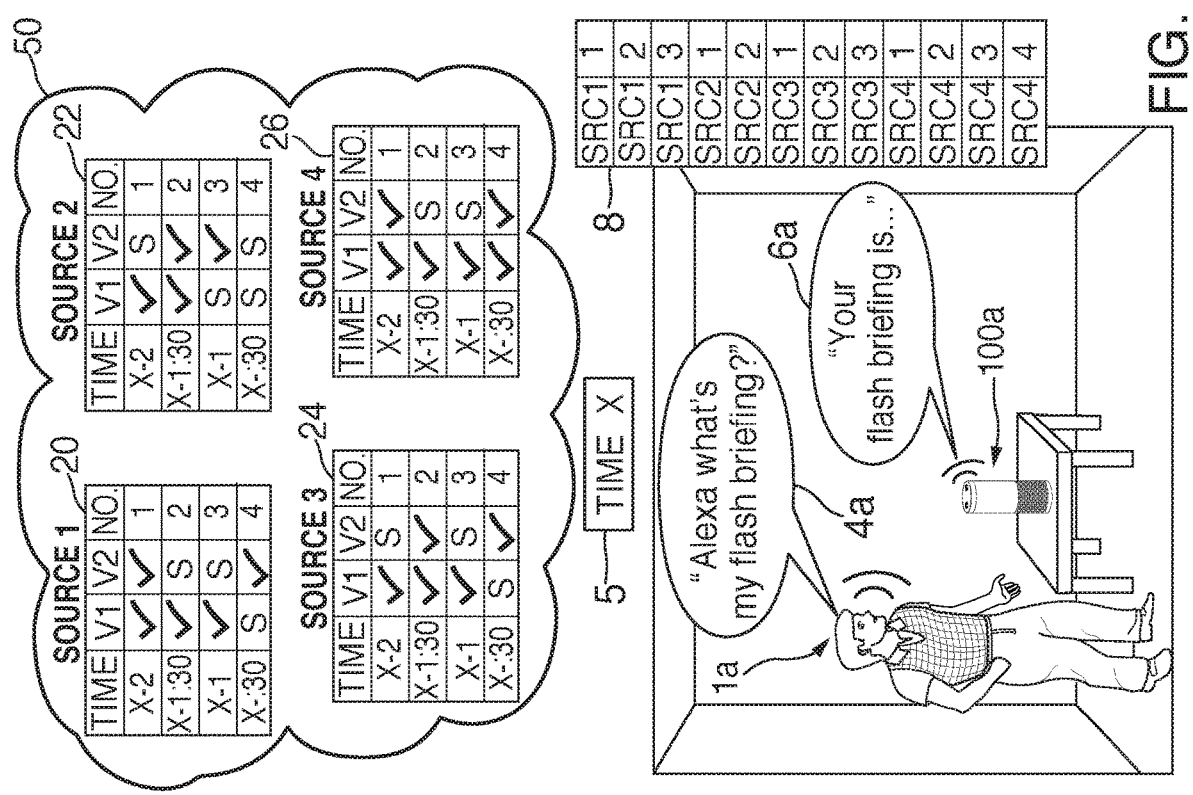

The present disclosure, as set forth below, is generally directed to various embodiments of systems, methods, and devices related providing content, such as news, sports, programming, or similar subscription-based content using voice-controlled devices. Devices such as Amazon's Echo are increasingly used by individuals for, among other things, communicating with friends, family, and associates, much like traditional land-line telephones had been used in earlier times, as well as being a hands-free source of information. The most common way to use such devices is for an individual to say a special word as part of an utterance, often referred to as a "wakeword," that the device is designed to recognize. For instance, a user may speak the utterance, "Alexa, What's My Flash Briefing?" to a voice-controlled device while sitting in his or her bedroom, living room, kitchen, etc. The user may have a list of news providers associated with a user account to which the voice-controlled device corresponds. That list of providers may be chosen as part of a skill or additional feature that a user could elect to enable, such as a Flash News Briefing feature.

When a user adds such a feature, the user can be provided with options that are relevant to the feature. For example, the user can be provided with a wide variety of content sources that may appeal to a wide variety of the population. News providers may include, without limitation, such sources as National Public Radio (NPR), Fox News Network (Fox), MSNBC (Microsoft National Broadcasting Company), CNN (Cable News Network), Associated Press (AP) Headline News, CBS News, NBC News, ABC News, Slate, Politico, Bloomberg, etc. Each news provider can update the selection of stories being offered in accordance with a varying schedule, such that some updates might occur hourly, other updates might occur daily, etc.

At a configuration page or Setup location, the user could select the news providers from which the Flash News Briefing would be compiled from (they could be selected using, for example, a list from an application, website, or other offering). Once the feature was enabled and configured, the user could simply invoke the feature by speaking an appropriate utterance such as, "Alexa, what's my flash news?" The system would then compile the news briefing by selecting a given number of news stories from each of the selected news providers and begin playing them sequentially (this might also be configurable by the user to play, for example, up to three news stories from any selected news provider). The user might listen to all of the stories that are played back, or the user might skip stories that appear to be of little or no interest to the particular individual (in which case the individual might simple say "Next," which could cause the electronic device to skip to the next story—in that situation, the electronic device would have had to switch modes to "open-mic" mode so that a wakeword would not be necessary to invoke a particular command). In some instances, the user might be interrupted, leaving one or more news stories in an "unplayed" state ("unplayed" could represent news stories that were not played back in their entirety, or it could represent news stories for which playback has not begun for a particular user).

At some point in the future, the same user might again invoke the feature by speaking the same or a similar utterance (such as "Alexa, please play my news"). In response, the system would simply start playing back whatever the current news stories were, even if some of them had already been played for the user.

The principles disclosed herein are equally applicable to virtually any content that can be provided with at least somewhat regular updates, such as subscription-based content. For example, an individual might subscribe to a YouTube channel that provides updates multiple times a day. In accordance with various embodiments disclosed herein, the systems and methods described below can be utilized to improve the customer experience by keeping track of, on an individual level, which content items have been played and which have not, where "played" includes listened to, watched, played back, read, or any other way of consuming content. In this manner, played refers generally to consuming content in any manner, regardless of format, and regardless of the method used to consume the content, including playing audio, playing video, playing combined audio/video, displaying written text, etc. Thus, news stories that are played in an audio-only mode by a voice-activated device are "played" in the same manner as YouTube videos that are played on a device having a screen, such as an Echo Show. For illustrative, non-limiting purposes only, much of the discussion below utilizes flash news briefings and news content as a primary example. The principles of the present disclosure apply equally well to any type of content that is provided and consumed on a regular basis, to enable a user to play and thereby consume that content in an efficient and enjoyable manner, without the risk of having "missed anything."

In accordance with various embodiments disclosed herein, however, the systems and methods discussed below provide additional capabilities so that when the flash news briefing feature (or similar content-based feature) is invoked, only "unplayed" news stories are played back (assuming the user configured the feature to operate in that manner, or the feature was itself configured to operate in that manner as a default setting). As news stories are played back, the system could maintain an indication using metadata of which stories had been played back or of which stories were still "unplayed," or some combination of both statuses. Then, if the user invoked the news flash briefing feature in the short term future, the system could skip any news stories that have already been played back, and only play back news stories that are classified as "unplayed."

By keeping track of the status of which news stories are "played" versus "unplayed" through the use of metadata, additional capabilities could be provided to further enhance the user's experience. For example, in the same manner, the system could also be configured to recognize which news stories were added to a particular news feed's queue since the last request for a flash news briefing occurred. In that instance, it may be beneficial to begin by playing back the most current news stories. After the playback of the newly added news stories has completed, the system, which includes a language processing system, could format a request for playback to the user such as "That's all the new news I have right now, would you like to continue your earlier flash news briefing." In this manner, the user could feel confident that the system is providing him or her with all of the news the individual would like to receive, and the user could feel confident that they weren't missing anything (or at least they had a choice on whether to skip certain items of news).

In order to implement this type of additional feature, the system would need to be able to also determine which news stories were updated (based on which sources were doing updates). This could be accomplished in a number of ways. In most instances, the update schedule of when updates occurred could be obtained from the news providers. Based on the timing of those updates, the system could determine which news stories existed prior to particular updates. For example, the system could maintain the time at which the last flash news briefing ended, and then correlate that to the time at which one or more updates occurred for each news or content provider. In each instance, one constant goal of the systems and methods disclosed herein is to enhance the user experience such that requested content is provided in a sensible, timely, and efficient manner that can fill the user with confidence as well as information.

Figure 1B:
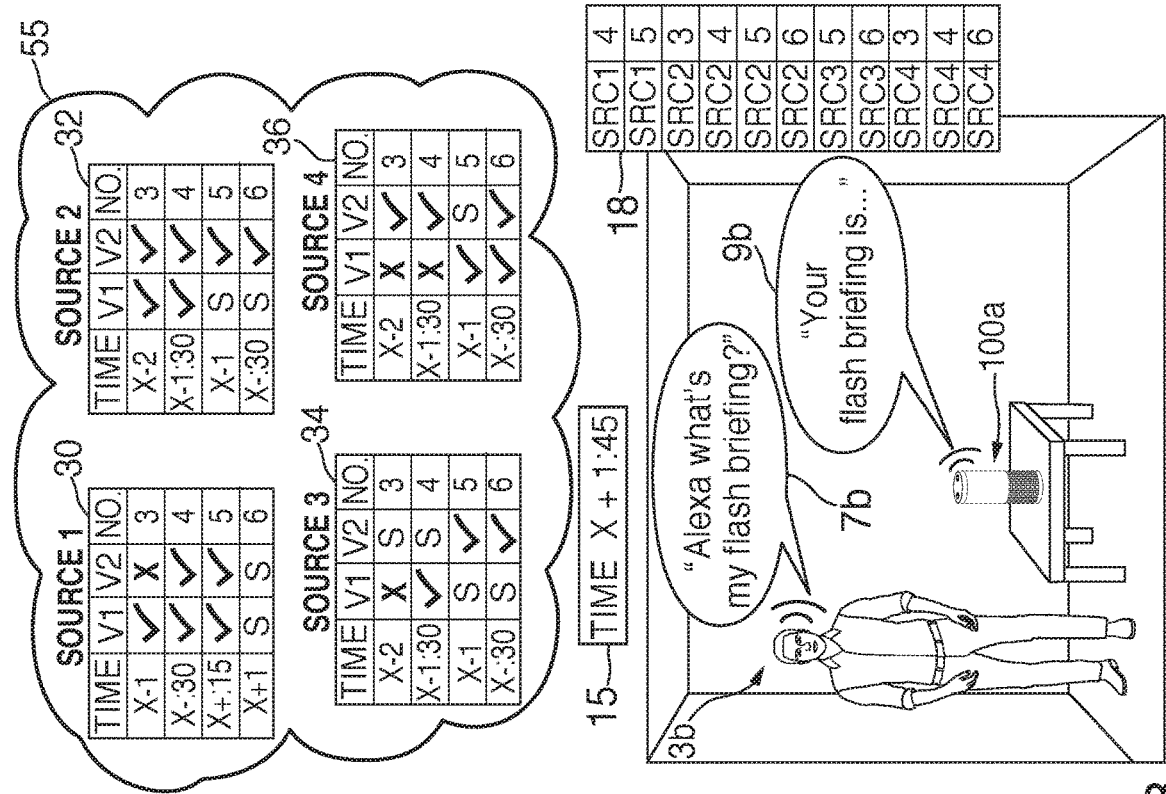
Figure 1B:
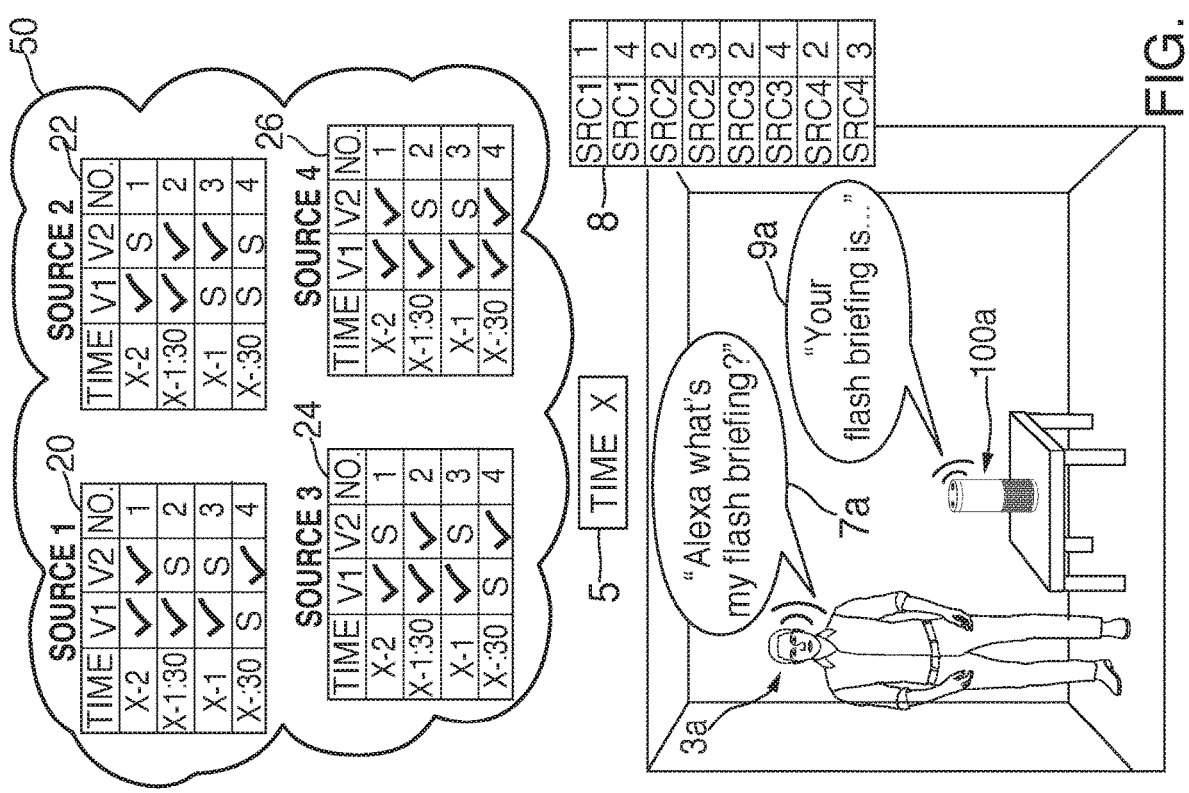

FIGS. 1A and 1B are illustrative diagrams of an exemplary system providing two different users (one user in FIG. 1A and another user in FIG. 1B) multiple flash news briefings in an efficient manner, in accordance with various embodiments. In a non-limiting, illustrative embodiment, in FIG. 1A, an individual 1a in a house at a first time 5 designated as time "X" may wish to hear some news. Accordingly, individual 1a may speak an utterance 4a, with the intention of invoking the flash news briefing feature in accordance with feature settings that the individual had configured. For example, utterance 4a may be "Alexa what's my flash briefing?" In this example, the name "Alexa" may correspond to a wakeword for a voice activated electronic device 100a, the term "what's" may correspond to an invocation phrase to initiate a command which, in this case, is to play a flash news briefing as configured by the user.

Given the request, the system could simply go to the user account associated with device 100a, and compile the current list of news storied from the providers the user previously enabled. As shown in the illustration in FIG. 1A, individual 1a has configured his flash news briefing to be compiled from four (4) different sources, which could include, for example, NPR, CNN, Fox, and AP, etc. As shown in FIG. 1A, news stories from each of the enabled content providers can be accumulated and stored for playback, and additional information could be maintained in connection with the news stories themselves, the user's playback status of those news stories, and/or both. For example, FIG. 1A shows that for each content provider, a series of information can be obtained that can be utilized to provide "unplayed" news stories to the requesting individual. Information can be maintained for each provider, as illustrated by source 1 (reference numeral 20), which shows four source 1 news stories labeled 1, 2, 3, and 4 (each set of content provided in this example is similarly with four items for illustrative purposes only), however, it will be apparent that different content sources may provide a different quantity of content for playback, and that all content providers may update that content in accordance with a similar or different schedule as compared to other content providers.

For each of the news stories labeled, 1, 2, 3, and 4, a time stamp is also maintained which, in the example shown in FIG. 1, is shown relative to time "X," such that, for example, source 1, story number 2 was added to the system one hour and thirty minutes prior time X. While each of the times for each news story from each of content providers 20, 22, 24, and 26 are the same for illustrative purposes, it is more likely than not than the times will vary both at the news story level and between content providers and the time with which they provide updates.

In addition to the information related to the news stories themselves, additional information is maintained that indicates which news stories have been played (as described above, "played" simply means that the content, in whatever format, has been output regardless of whether the output was audio, video, combined audio/video, displayed text, etc.). That information can be provided by simply designating when each news item is played, or a more refined approach could be utilized, such as where the system marks each item played during a given session, and they changes those markings when a new session occurs. Such a capability could provide the users with the capability to request playback of news stories that were played during a given session (by stating an utterance such as "Alexa, please playback that news again," which could let the user listen while skipping to a particular news story that was recently played back).

Each content provider may have different designations such that news stories might be configured to play with different priorities. For example, during the flash news briefing shown at time X in FIG. 1, three stories from source 1 designated numbers 1, 2, and 3 were played back, while only two stories from source 2 (reference numeral 22) were played back (designated numbers 1 and 2). Similarly, three stories were played back from source 3 (reference numeral 24) (numbers 1, 2, and 3), while all of the available content from source 4 (reference numeral 26) was played back (i.e., numbers 1-4). This is illustrated by listing 8, which is sorted based on the numeric designation of each news article, as provided by content providers in sequence. For example, the system could play back a message stating "News from source 1 includes [story 1, story 2, and story 3], while the news from source 2 includes [story 1 and story 2], and news from source 3 includes [story 1, story 2, and story 3], and source 3 includes [story 1, story 2, story 3, and story 4]. For each of the stories that were played back, the system could make a designation such as the check marks shown in each of matrices 20, 22, 24, and 26.

Also shown in FIG. 1A is the same individual (now labeled as 1b to reflect the change over time) at time 15, which is now one hour and forty-five minutes later (or time=X+1:45). In accordance with potentially adjustable user settings, or potentially controlled by the content provider, certain news items may expire after a given time and be removed from the list, at least in part to make room for more recent news items. For purposes of illustration and simplicity therein, each of the content providers shown in FIG. 1A shows the same time designations at time 15, just as they showed the same time designations at time 5. In normal conditions, however, the time designations will likely vary between providers, as well as within a given provider. In addition, while the illustration shown in FIG. 1A shows that news items 1 and 2 have become "stale" and have been removed for each content provider, under normal conditions, each content provider will establish its own criteria for deciding when to remove a content item from being available for playback. The content providers, for illustrative purposes, have been designated as 30, 32, 34, and 36 instead of 20, 22, 24, and 26, to show that the content stored therein for playback has changed during the intervening one hour and forty-five minutes. Collectively, the content at time 5 is illustrated collectively by reference numeral 50, while the content at time 15 is illustrated collectively by reference numeral 55.

In this manner, for example, each of the remaining content items for each content provider is designated as items 3, 4, 5, and 6, having a time, respectively, of X−1, X−:30, X+:15, and X+1 (e.g., news item 6 was added one hour after time 5, or 45 minutes prior to time 15). This time, when individual 1b again asks "Alexa, what's my flash briefing?" the system can respond by providing only those news items that were previously "unplayed" as well as any news items that have been added since the flash news briefing occurred at time 5 (provided the user has configured the system to provide news on an "unplayed" basis). As previously described, once the prior session ended, the news items that were played back during the previous session could have had their check designations switched to X designations once that playback session ended. Accordingly, in this illustration, news item 3 from source 1, news item 3 from source 3, and news items 3 and 4 from source 4, have all been designated X, while news items 4 and 5 from source 1, 3 and 4 from source 2, 4 from source 3, and 5 and 6 from source 4, have all been designated with checks (i.e., to indicate that they were played back during the current session). This can result is listing 18 that shows the seven "played" or new news items that were played back during the session.

FIG. 1B illustrates the same system performing in the same manner, but for user 3a (and 3b at time 15), instead of user 1a. Accordingly, the system keeps track of different content items that have been played or that remain unplayed. It should also be noted that even though FIGS. 1A and 1B show the same sources for both individuals 1 and 3, in most practical instances, each individual may select any number of different sources from which to get content. As shown in FIG. 1B, individual 3a at time X (reference numeral 5), says in utterance 7a "Alexa, what's my flash briefing?" and the response 9a is "Your flash briefing is . . . " followed by eight different contents items being view, as shown in table 8. In the example shown, individual 3a played items 1 and 4 from source 1 (skipping items 2 and 3, which remain unplayed), items 2 and 3 from source 2 (skipping items 1 and 4), items 2 and 4 from source 3 (skipping items 1 and 3), and items 2 and 3 from source 4 (skipping items 1 and 4). This compares with FIG. 1A which shows that individual 1a played twelve content items.

FIG. 1B also shows an illustration of what might occur at time 15 (i.e., 1 hour and 45 minutes later), when individual 3B says utterance 7b which asks "Alexa, what's my flash briefing." Again, a response 9b is provided "Your flash briefing is . . . " and content follows. In this instance, individual 3b takes time to catch up on stories that were skipped, as well as to listen to new content items. This is illustrated in table 18, that shows that individual 3B has played eleven content items during this flash briefing (as compared to the seven content items individual 3a played). FIGS. 1A and 1B (as well as any number of figures that are substantially similar to FIGS. 1A and 1B, but for different users who may play content items from different sources) illustrate how the methods and systems described in the present disclosure can be used to manage the playing of updateable content.

Figure 2:
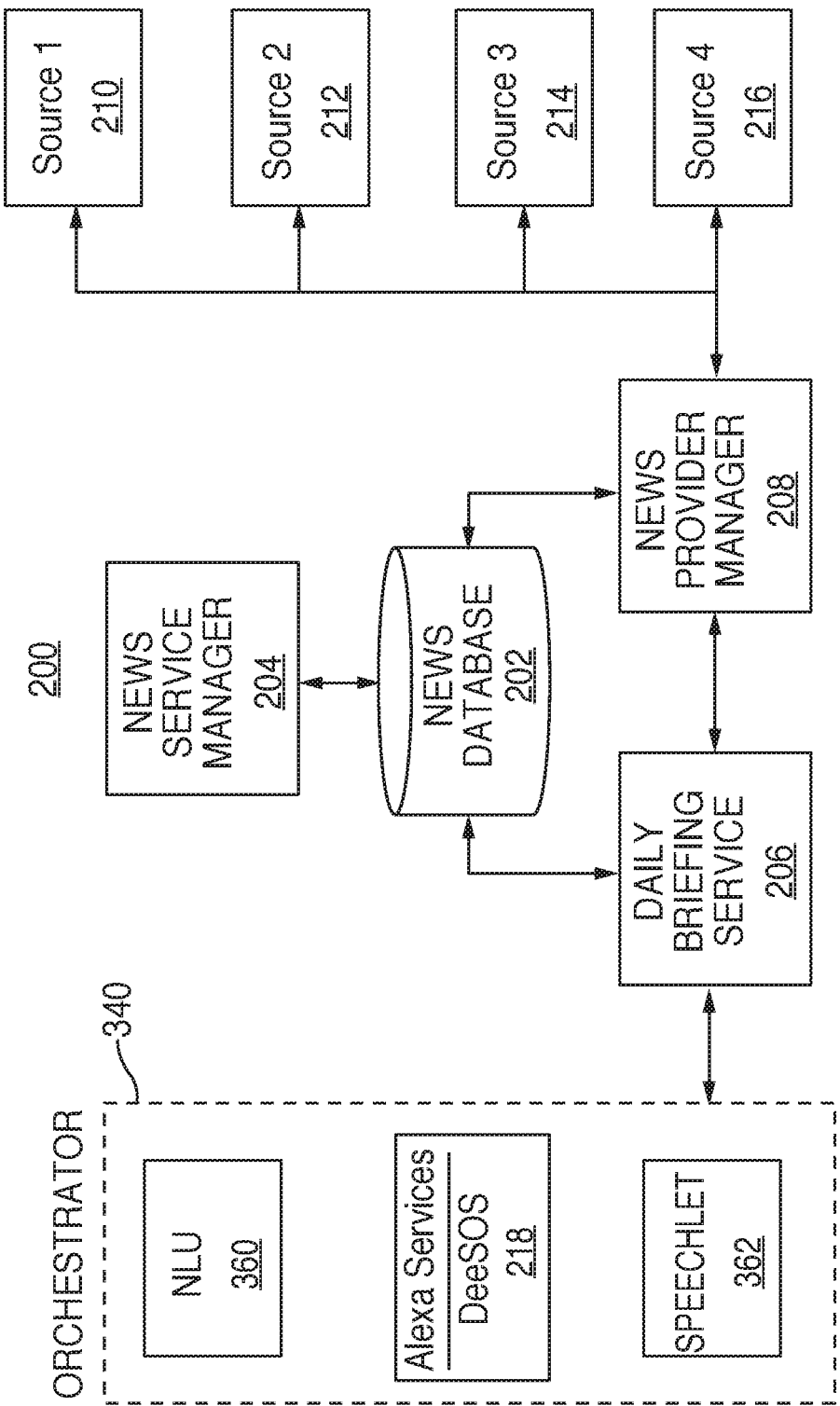
FIG. 2 is an illustrative diagram of a representative system architecture for providing content that have not yet been played to an electronic device, in accordance with various embodiments.

FIG. 2 is an illustrative schematic diagram of a flash news briefing system 200 that can be utilized in accordance with the systems and methods disclosed herein. While FIG. 2 is directed at "news briefing," it will be understood that the principles and features described herein may be applied to any source of content, particularly to sources of content in which the content is updated in a regular manner. Flash news brief system 200 communicates with language processing system 300 (shown in FIG. 3 and described below) through orchestrator 340, which provides commands received via natural language understanding (NLU) processing sub-system 360 (shown in more detail in FIG. 3 and also described more fully below). In general, voice-activated commands are received by devices such as device 100a shown in FIGS. 1A and 1B, which generate digital audio data from the spoken text. The digital audio data is transmitted to the language processing system via a network, such as a Wi-Fi network connected through the internet. The language processing system includes an automatic speech recognition sub-system that converts the received digital audio data into words, which are passed to NLU 360 to be analyzed for meaning. For example, when individual 1 shown in FIG. 1 spoke the utterance "Alexa, what's my flash briefing," NLU 360 determined that individual 1 has a user profile in which flash briefings have been enabled for use, and that when invoked, are to be accomplished utilizing four news providers designated as source 1, source 2, source 3, and source 4.

NLU 360 begins the process by sending appropriate instructions to Alexa Services/DeeSOS 218. Alexa Services.DeeSOS 218 formats a flash news briefing command using appropriate slots and intents and send the information to speechlet 362 to connect to flash news briefing sub-system 200. Speechlet 362 connects to flash new bringing sub-system 200 through daily briefing service 206, which communicates with news database 202. News service manager 204 controls and/or requests the content that is deposited within, or withdraw or deleted from, news database 202. News provider manager 208 interfaces with the external sources of news content, which is the illustration shown in FIG. 2 include source 1 (210), source 2 (212), source 3 (214), and source 4 (216). Each of content providers 210, 212, 214, and 216 (as well as other content providers once they are enabled), can provide news content updates through news provider manager 208 in accordance with a predetermined schedule that may be unique for each provider.

Accordingly, news service manager 204 controls the content of news database 202 by requesting news updates and/or managing news updates when they are provided by the content providers. News provider manager 208 essentially follows the instructions from new service manager 204, by acquiring content from third parties and by depositing that content into news database 202. News services manager 204 be utilized to maintain the status of "unplayed" news items within a given user account, and .or such information could be provided directly to the natural language processing system, wherein user information can be maintained by sub-system 368.

As briefly described above, speech processing system (or computing system) 300 may include a specific speech-processing system that, in some embodiments, is configured to determine an intent of a spoken utterance using the received audio data, and generate a response to the utterance and/or cause one or more actions to be performed. For instance, upon receiving audio data representing utterance 4, the speech-processing system may generate text data representing the audio data by performing automatic speech recognition ("ASR") processing on the audio data to produce text data, and may utilize natural language understanding ("NLU") processing performed on the produced text data to determine an intent of the utterance. The speech-processing system may further determine that the intent of the utterance includes, for example, an intent to play a particular individual's favorite playlist or to play a particular individual's flash news briefing.

The process of determining the intent also may take as an input whether or not the specific device 100a has any users that have enrolled to use voice recognition. If there are such users, speech system 300 can analyze the received audio data for voice recognition determination via user accounts 368, in order to more easily manage commands received through individual device 100a. For example, if voice recognition features are enabled, utterances 4a and 4b shown in FIG. 1A (or utterances 7a and 7b show in FIG. 1B), could be analyzed to determine whether a successful voice recognition is present. If voice recognition is successful, then speech processing system could identify the specific user who invoked the request for a flash briefing, access that specific user's flash briefing instructions, and then execute those instructions accordingly. Otherwise, speech processing system 300 may have to make prepare and format inquiries to individuals 1 and 3 in order to determine where to find the user profile for individuals 1 and 3 (i.e., to determine the proper instructions and content needed to fulfill the flash briefing request).

Figure 3:
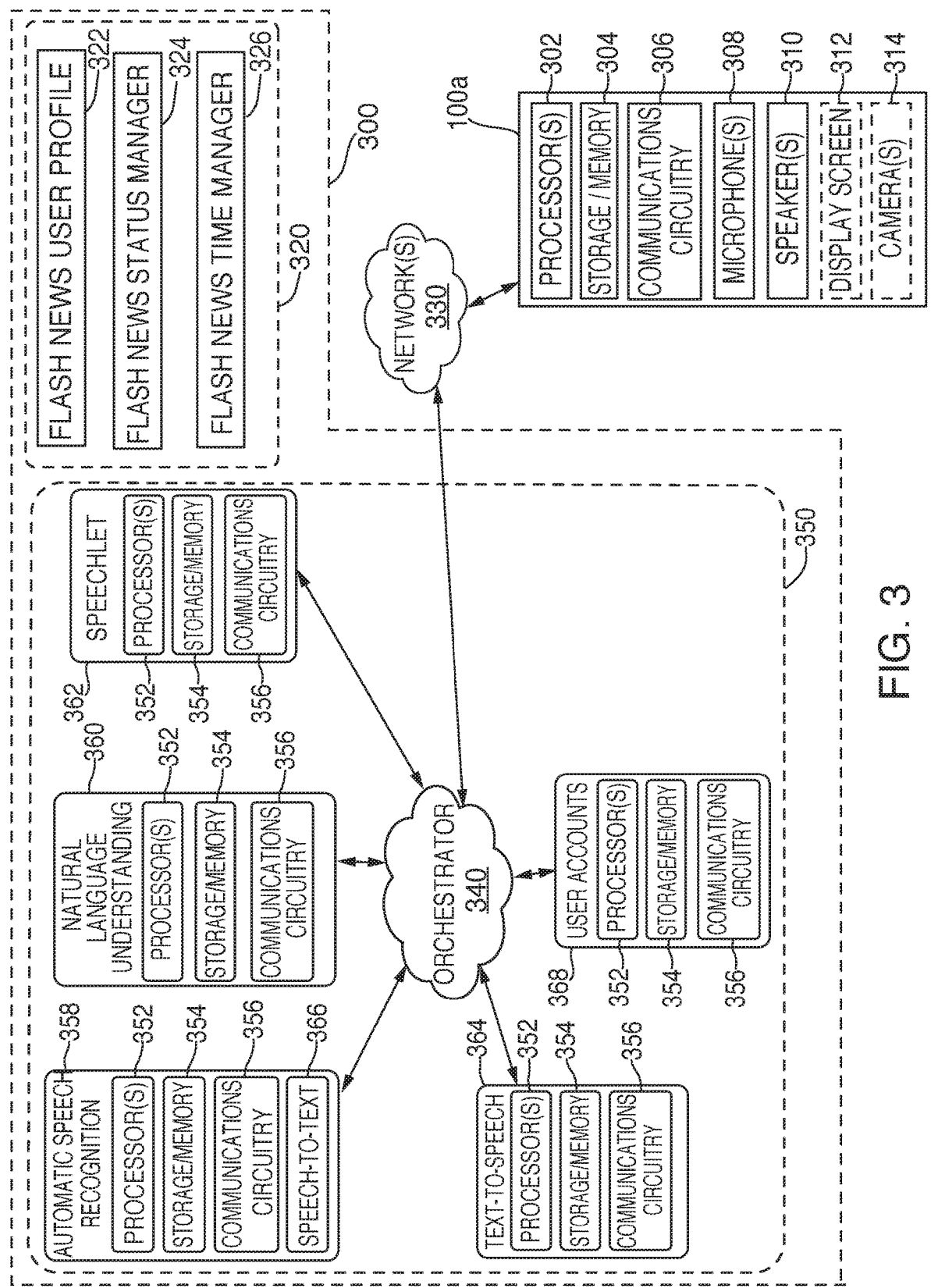
FIG. 3 is an illustrative diagram of an exemplary system architecture that can be utilized by, for example, the systems shown in FIG. 1 and FIG. 2, in accordance with various embodiments.

FIG. 3 is an illustrative diagram of the exemplary system architecture of speech processing system 300 that can be used as described above in connection with FIGS. 1A and 1B and 2, in accordance with various embodiments. While FIG. 3 primarily relates to speech processing system 300, FIG. 3 also shows representative components of electronic device 100a, which may be connected to speech processing system 300 wirelessly through, for example, network 330 (which may be, for example, a Wi-Fi network connected to the internet). Device 100a may, in some embodiments, include sound controlled functionality, such as one or more voice or sound activated components. In some embodiments, electronic device 100a may be configured such that it may communicate with speech processing system 300, and in particular the core speech-processing system 350, in response to detecting an utterance that includes a wakeword, which may subsequently be followed by a request, a question, a statement, or an intent, for instance. Similarly, electronic device 100a may alternatively or additionally include one or more manually activated components for manually controlled functionality.

In this particular scenario, electronic device 100a may also be configured, in some embodiments, to communicate with speech processing system 300, and in particular, core speech-processing system 350, in response to a manual input being detected by one or more input mechanisms, such as a touch screen, a button, and/or a switch, for example. The broader speech processing system 300 may be referred to below as simply computing system 300, and core system 350 may be referred to as speech processing system 350 (at least in part because the components contained within the dashed line labeled 350 represent the core, basic components used to provide voice-controlled functionality to users through voice-controlled devices such as 100a). For example, the components shown inside dashed line 350 receive audio data representing utterances from devices 100a, apply automatic speech recognition module 358 to that data to produce text data that is then analyzed by natural language understanding module 360. Additional functionality may be brought in via speechlets module 362 (such as voice recognition functionality). Resultant messages for the user are prepared by text-to-speech module 364. And access to user account can be provided by user account module 368. Flash news control and information as shown in FIG. 2 can be resident within computing system 300, or it may be considered to be a stand-alone subsystem that communications with core speech processing system 350.

For purposes of illustration, the flash news components that might otherwise fall within the purview of speechlets 362, may be considered as subsystem 320, and which may include flash news user profile 322, flash news status manager 324 (which may simply be subset of news service manager 204 of FIG. 2), and flash news time manager 326 (which may also be a sub-system of news service manager 204.

In non-limiting embodiments, electronic device 100a may be capable of being activated in response to detecting a specific sound, such as a wakeword, as well as, or alternatively, via one or more inputs. After detecting a specific sound (e.g., a wakeword or trigger expression), electronic device 100a may recognize commands (e.g., audible commands, inputs, etc.) within captured audio, and may perform one or more actions in response to the received commands. Furthermore, electronic device 100a may also be configured to perform one or more actions in response to detecting a particular touch, or other mechanical inputs via electronic device 100a.

Electronic device 100a may correspond to any suitable type of electronic device including, but not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, electronic device 100a may be relatively simple or basic in structure such that no, or a minimal number of, mechanical input option(s) (e.g., keyboard, mouse, track pad) or touch input(s) (e.g., touch screen, buttons) are included. For example, electronic device 100a may be able to receive and output audio, and may include power, processing capabilities, storage/memory capabilities, and communication capabilities. However, in other embodiments, electronic device 100a may include one or more components for receiving mechanical inputs or touch inputs, such as a touch screen and/or one or more buttons.

Electronic device 100a, in some embodiments, may include a minimal number of input mechanisms, such as a power on/off switch such that functionality of electronic device 100a may solely or primarily be through audio input and audio output. For example, electronic device 100a may include, or be in communication with, one or more microphones that listen for a wakeword by continually monitoring local audio. In response to the wakeword being detected, electronic device 100a may establish a connection with computing system 300 and/or speech-processing system 350, send audio data to computing system 300 and/or speech-processing system 350, and await/receive a response from computing system 300 and/or speech-processing system 350. In some embodiments, however, non-voice/sound activated devices may also communicate with computing system 300 and/or speech-processing system 350 (e.g., push-to-talk devices). For example, in response to a button or touch screen being pressed, or a button or touch screen being pressed and held, a microphone associated with electronic device 100a may begin recording local audio, and may establish a connection with computing system 300 and/or speech-processing system 350, send audio data representing the captured audio to computing system 300 and/or speech-processing system 350, and await/receive a response from computing system 300 and/or speech-processing system 350.

Persons of ordinary skill in the art will recognize that although in the illustrative embodiment, computing system 300 includes speech-processing system 350, this is merely exemplary, and speech-processing system 350 may be separate from computing system 300. For example, speech-processing system 350 may be located within a dedicated computing device, which may or may not be in communication with computing system 300 and/or one or more additional devices.

Electronic device 100a may include one or more processors 302, storage/memory 304, communications circuitry 306, one or more microphones 308 or other audio input devices (e.g., transducers), one or more speakers 310 or other audio output devices, a display screen 312, and one or more cameras 314 or other image capturing components. However, one or more additional components may be included within electronic device 100a, and/or one or more components may be omitted. For example, electronic device 100a may also include a power supply or a bus connector. As still yet another example, electronic device 100a may include one or more additional input and/or output mechanisms, such as one or more buttons, or one or more switches or knobs. As another example, electronic device 100a may lack a display screen. Furthermore, while electronic device 100a may include multiple instances of one or more components, for simplicity only one of each component has been shown.

In some embodiments, electronic device 100a may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, electronic device 100a may be in communication with an additional processing device including one or more of: processor(s) 302, storage/memory 304, communications circuitry 306, microphone(s) 308, speaker(s) 310, display screen 312, and/or camera(s) 314. For example, a centralized control device of electronic device 100a may include one or more microphone(s) 308. These microphone(s) 308 may receive audio input signals, which in turn may be sent to computing system 300 and/or speech-processing system 350 in response to a wakeword engine of electronic device 100a determining that a wakeword was uttered.

Processor(s) 302 may include any suitable processing circuitry capable of controlling operations and functionality of electronic device 100a, as well as facilitating communications between various components within electronic device 100a. In some embodiments, processor(s) 302 may include a central processing unit ("CPU"), a graphic processing unit ("GPU"), one or more microprocessors, a digital signal processor, or any other type of processor, or any combination thereof. In some embodiments, the functionality of processor(s) 302 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 302 may include its own local memory, which may store program modules, program data, and/or one or more operating systems. However, processor(s) 302 may run an operating system ("OS") for electronic device 100a, and/or one or more firmware applications, media applications, and/or applications resident thereon. In some embodiments, processor(s) 302 may run a local client script for reading and rendering content received from one or more websites. For example, processor(s) 302 may run a local JavaScript client for rendering HTML or XHTML content received from a particular URL accessed by electronic device 100a.

Storage/memory 304 may include one or more types of storage mediums such as any volatile or non-volatile memory, or any removable or non-removable memory implemented in any suitable manner to store data for electronic device 100a. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 304 may be implemented as computer-readable storage media ("CRSM"), which may be any available physical media accessible by processor(s) 302 to execute one or more instructions stored within storage/memory 304. In some embodiments, one or more applications (e.g., gaming, music, video, calendars, lists, etc.) may be run by processor(s) 302, and may be stored in memory 304.

In some embodiments, storage/memory 304 may store one or more audible and/or visual messages to be provided to electronic device 100a for indicating that a communications session is about to end if speech is not detected. For example, storage/memory 304 may store one or more audible messages and/or GUIs that include a counter that counts down from a preset time until zero, at which point the communications session may end.

In some embodiments, storage/memory 304 may include a media system 316, which may be configured to facilitate communications between electronic devices 100a and computing system 300. For example, media system 316 may store one or more communications protocols that may be executed by processor(s) 302 for facilitating communications for device 100a. In some embodiments, a sessions initiation protocol ("SIP") may be used to facilitate media transfer between electronic device 100a and one or more of computing system 300 (e.g., communications system 328) and another electronic device 100a. SIP, for example, is an application layer protocol that is text based, and may employ Real-time Transport Protocol ("RTP") or Secure Real-time Transport Protocol ("SRTP") functions. In particular, PJSIP communications functionality may be employed by media system 316 to support audio, video, presence, and messaging communications for electronic device 100a. In some embodiments, a Web Real-Time Communications ("WebRTC") protocols may be employed by electronic device 100a. In a non-limiting embodiment, media system 316 may include instructions that indicate which communications protocols to employ for facilitating media transfer between devices based on a device type of electronic device 100a. For example, if electronic device 100a does not include display 312 and/or camera 314, then media system 316 may indicate that PJSIP should be used, whereas if electronic device 100 includes display 312 and/or camera 314 then media system 316 may indicate that WebRTC protocols should be used.

In some embodiments, storage/memory 304 may include one or more modules and/or databases, such as a speech activity detection system (described in greater detail below with reference to speech activity detection system 322), a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 310, and/or a speech-to-text ("STT") component capable of converting received audio signals into text to be sent to computing system 300 and/or speech-processing system 350 for processing.

The wakeword database may be a database stored locally by storage/memory 304 of electronic device 100a, and may include a list of current wakewords for electronic device 100a, as well as one or more previously used, or alternative, wakewords electronic device 100a. In some embodiments, an individual may set or program a wakeword for their electronic device 100a. The wakeword may be programmed directly on electronic device 100a, or a wakeword or wakewords may be set by the individual via a local client application that is in communication with computing system 300 and/or speech-processing system 350. For example, an individual may use their mobile device having the speech-processing system application running thereon to set the wakeword. The specific wakeword may then be communicated from the mobile device to speech-processing system 350, which in turn may send/notify electronic device 100a of the individual's selection for the wakeword. The selected activation may then be stored in the wakeword database of storage/memory 304. In some embodiments, additional trigger expressions or permutations of the wakeword may also be stored within storage/memory 304. For example, specific trigger expressions or words that indicate the presence of the wakeword may also be stored within storage/memory 304. In some embodiments, audio watermarks, indicating a specific action or message, may also be stored within storage/memory 204.

In some embodiments, sound profiles for different words, phrases, commands, or audio compositions are also capable of being stored within storage/memory 304, such as within a sound profile database. For example, a sound profile of audio may be stored within the sound profile database of storage/memory 304 on electronic device 100a. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 308 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 308. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 308. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100a may then begin transmitting the audio signal to speech-processing system 350 for detecting and responds to subsequent utterances made by an individual.

Communications circuitry 306 may include any circuitry allowing or enabling one or more components of electronic device 100a to communicate with one another, one or more additional devices, servers, and/or systems. For example, communications circuitry 306 may facilitate communications between electronic device 100a and computing system 300. As an illustrative example, audio data representing an utterance (e.g., utterance 4a of FIG. 1A) may be transmitted over a network 330, such as the Internet, to computing system 300 using any number of communications protocols. For example, network(s) 330 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100a and computing system 300. In some embodiments, electronic device 100a and computing system 300 and/or one or more additional devices or systems (e.g., speech-processing system 350) may communicate with one another via a web browser using HTTP. Various additional communication protocols may be used to facilitate communications between electronic device 100a and computing system 300, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 306 may use any communications protocol, such as any of the previously mentioned exemplary communications protocols. In some embodiments, electronic device 100a may include an antenna to facilitate wireless communications with a network using various wireless technologies (e.g., Wi-Fi, Bluetooth, radiofrequency, etc.). In yet another embodiment, electronic device 100a may include one or more universal serial bus ("USB") ports, one or more Ethernet or broadband ports, and/or any other type of hardwire access port so that communications circuitry 306 allows electronic device 100a to communicate with one or more communications networks.

Electronic device 100a may also include one or more microphones 308 and/or transducers. Furthermore, one or more microphones located within a separate device may be in communication with electronic device 100a to capture sounds for electronic device 100a. Microphone(s) 308 may be any suitable component capable of detecting audio signals. For example, microphone(s) 308 may include one or more sensors for generating electrical signals and circuitry capable of processing the generated electrical signals. In some embodiments, microphone(s) 308 may include multiple microphones capable of detecting various frequency levels. As an illustrative example, electronic device 100a may include multiple microphones (e.g., four, seven, ten, etc.) placed at various positions about electronic device 100a to monitor/capture any audio outputted in the environment where electronic device 100a is located. The various microphones 308 may include some microphones optimized for distant sounds, while some microphones may be optimized for sounds occurring within a close range of electronic device 100a. In some embodiments, microphone(s) 308 may only begin to detect audio signals in response to a manual input to electronic device 100a. For example, a manually activated device may begin to capture audio data using microphone(s) 308 in response to a user input, such as pressing a button, tapping a touch screen, or providing any touch input gesture to a touch input component.

Electronic device 100a may include one or more speakers 310. Furthermore, electronic device 100a may be in communication with one or more speaker(s) 310. Speaker(s) 310 may correspond to any suitable mechanism for outputting audio signals. For example, speaker(s) 310 may include one or more speaker units, speaker housings, transducers, arrays of speakers, and/or arrays of transducers that may be capable of broadcasting audio signals and or audio content to a surrounding area where electronic device 100a may be located. In some embodiments, speaker(s) 310 may include headphones or ear buds, which may be wirelessly wired, or hard-wired, to electronic device 100a, that may be capable of broadcasting audio directly to an individual.

In some embodiments, one or more microphones 308 may serve as input devices to receive audio inputs. Electronic device 100a, in the previously mentioned embodiment, may then also include one or more speakers 310 to output audible responses. In this manner, electronic device 100a may function solely through speech or audio, without the use or need for any input mechanisms or displays, however this is merely exemplary.

Display screen 312 may correspond to a display device and/or touch screen, which may be any size and/or shape and may be located at any portion of electronic device 100a. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 312 may correspond to a projected capacitive touch ("PCT"), screen include one or more row traces and/or driving line traces, as well as one or more column traces and/or sensing lines. In some embodiments, display screen 312 may be an optional component for electronic device 100a. For instance, electronic device 100a may not include display screen 312. Such devices, sometimes referred to as "headless" devices, may output audio, or may be in communication with a display device for outputting viewable content.

Display screen 312, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 312, a capacitance between the object and the conductive material may be formed. Processor(s) 202 may be capable of determining a location of the touch screen associated with where the capacitance change is detected, and may register a touch input as occurring at that location.

In some embodiments, display screen 312 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 312 corresponding to where a conductive object contacted display screen 312.

A change in capacitance may be measured to determine a location on the touch screen where the object has contacted the surface. For example, if an individual touches a point on display screen 312, then a corresponding driving line and sensing line that intersect at that point may be identified. A location of the point may have one or more pixels associated with that location, and therefore one or more actions may be registered for an item or items that are displayed at that location. Processor(s) 302 of electronic device 100a may be configured to determine which pixels are associated with a particular location point, and which item or items are also displayed at that pixel location. Furthermore, electronic device 100a may be configured to cause one or more additional actions to occur to the item or items being displayed on display screen 312 based on a temporal duration the touch input, and or if one or more additional touch inputs are detected. For example, an object that contacted display screen 312 at a first location may be determined, at a later point in time, to contact display screen 312 at a second location. In the illustrative example, an object may have initially contacted display screen 312 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 312 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 312 may correspond to a high-definition ("HD") display. For example, display screen 312 may display images and/or videos of 720p, 1080p, 1080i, or any other image resolution. In these particular scenarios, display screen 312 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 312, such as non-HD displays, 4K displays, and/or ultra high definition displays.

In some embodiments, electronic device 100a may include one or more cameras 314, corresponding to any suitable image capturing component or components capable of capturing one or more images and/or videos. Camera(s) 314 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100a may include multiple cameras 314, such as one or more front-facing cameras and/or one or more rear facing cameras. Furthermore, camera(s) 314 may be configured to recognize far-field imagery (e.g., objects located at a large distance away from electronic device 100a) or near-filed imagery (e.g., objected located at a relatively small distance from electronic device 100a). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100a. For instance, camera(s) 314 may be external to, and in communication with, electronic device 100a. For example, an external camera may be capable of capturing images and/or video, which may then be provided to electronic device 100a for viewing and/or processing.

Persons of ordinary skill in the art will recognize that, in some embodiments, display screen 312 and/or camera(s) 314 may be optional for electronic device 100a. For instance, electronic device 100a may function using audio inputs and outputting audio, and therefore display screen 312 and/or camera(s) 314 may not be included. Furthermore, in some embodiments, electronic device 100a may not include display screen 312 and/or camera(s) 314, but instead may be in communication with display screen 312 and/or camera(s) 314. For example, electronic device 100a may be connected to a display screen via a Wi-Fi (e.g., 802.11 protocol) connection such that visual content sent to electronic device 100a may be sent to the display screen, and output thereby.

In one exemplary embodiment, electronic device 100a may include an additional input/output ("I/O") interface. For example, electronic device 100a may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100a may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100a. For example, one or more LED lights may be included on electronic device 100a such that, when microphone(s) 308 receives audio, the one or more LED lights become illuminated signifying that audio has been received by electronic device 100a. In some embodiments, one or more vibrating mechanisms or other haptic features may be included with electronic device 100a to provide a haptic response to an individual.

In some embodiments, electronic device 100a may include radio-frequency identification ("RFID") functionality and/or near field communication ("NFC") functionality. Furthermore, in some embodiments, electronic device 100a may include one or more infrared ("IR") sensors and one or more IR emitters. The IR sensors/emitters may be used to determine depth information. For example, in some embodiments, a distance of an individual from electronic device 100a may be determined using the one or more IR sensors/emitters. Depth determination may be performed using any depth determination technique. In some embodiments, a distance between an individual and electronic device 100a may be employed as a basis for presenting content with varying density using display screen 312. For example, when an individual is at a distance A from electronic device 100a, electronic device 100a may display weather data for a current day. However as the user moves closer to electronic device 100a, such as at a distance B from electronic device 100a, which may be less than distance A, electronic device 100a may display weather data for a current week. For instance, as the individual gets closer to electronic device 100a, the ability of the individual to see denser content increases, and as the individual moves father away from electronic device 100a, the individual's ability to see denser content decreases. This, for example, may ensure that the content displayed by electronic device 100a is continually relevant and readable by the individual.

Computing system 300, in a non-limiting, exemplary embodiment, may include speech-processing system 350. However, in other embodiments, speech-processing system 350 may be separate from, or in communication with, computing system 300. Generally, speech-processing system 350 may, in some embodiments, include one or more remote devices capable of receiving and sending content from/to one or more electronic device, such as electronic device 100a. Speech-processing system 350 may include various components and modules including, but not limited to, ASR module 358, NLU module 360, speechlets module 362, TTS module 364, and user accounts module 368. In some embodiments, speech-processing system 350 may also include computer readable media, including, but not limited to, flash memory, random access memory ("RAM"), and/or read-only memory ("ROM"). Speech-processing system 350 may also include various modules that store software, hardware, logic, instructions, and/or commands for speech-processing system 350, such as a speaker identification ("ID") module, or any other module, or any combination thereof.

ASR module 358 may be configured to recognize human speech in detected audio, such as audio captured by microphone(s) 308 which may then be transmitted to speech-processing system 350. ASR module 358 may include, in some embodiments, one or more processor(s) 352, storage/memory 354, and communications circuitry 356. Processor(s) 352, storage/memory 354, and communications circuitry 356 may, in some embodiments, be substantially similar to processor(s) 302, storage/memory 304, and communications circuitry 306, which are described in greater detail above, and the aforementioned descriptions may apply. In some embodiments, ASR module 358 may include speech-to-text ("STT") module 366. STT module 366 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 358 may include an expression detector that analyzes audio signals received by speech-processing system 350, such as the expression detector mentioned above with regards to electronic device 100a. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase is represented within the audio signal. The expression detector may then compare that score to a threshold value to determine whether the wakeword or phrase will be declared as having been spoken.

NLU module 360 may be configured such that it determines user intent based on the received audio data. For example, NLU module 360 may determine that the intent of utterance 4 in FIG. 1 is for initiating a communications session with a device, associated with a particular entity name (e.g., initiate a communications session with "Cruise"). In response to determining the intent of the utterance, NLU module 360 may communicate the received command to an appropriate subject matter server or skill on speechlets module 362 to perform one or more tasks, and/or retrieve an appropriate response or response information. NLU module 360 may include processor(s) 352, storage/memory 354, and communications circuitry 356 which, in some embodiments, may be substantially similar to processor(s) 302, storage/memory 304, and communications circuitry 306 of electronic device 100a, and the previous description may apply.

Speechlets module 362 may, for example, correspond to various action specific systems or servers, sometimes referred to as "skills," capable of processing various task specific actions. Speechlets module 362 may further correspond to first party applications and/or third party applications capable of performing various tasks or actions. For example, based on the context of the audio received from electronic device 100a, speech-processing system 350 may use a certain functionality to generate a response, or to obtain response information, which in turn may be communicated back to electronic device 100a. For instance, an utterance may ask to communicate with another individual (and that individual may be associated with a user account represented by an entity name), and therefore speechlets module 362 may access communications system 328 (or in some embodiments, third party messaging applications) to obtain contact information relating to user accounts and devices associated with or belonging to the user account associated with electronic device 100a. Speechlets module 362 may also include processor(s) 352, storage/memory 354, and communications circuitry 356.

TTS module 364 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 364 may also include processor(s) 352, storage/memory 354, and communications circuitry 356.

User accounts module 368 may store one or more user profiles corresponding to users having a registered account on computing system 300. For example, a parent may have a registered account on computing system 300, and each of the parent's children may have their own user profile registered under the parent's registered account. Information, settings, and/or preferences, for example, for each user profile may be stored within a user profile database. In some embodiments, user accounts module 368 may store a voice signal, such as voice biometric information, for a specific user profile. This may allow speaker identification techniques to be used to match a voice-to-voice biometric data associated with a specific user profile. In some embodiments, user accounts module 368 may store a telephone number assigned to a particular user profile.

Additionally, in some embodiments, user accounts module 368 may store contacts associated with a particular user account and/or user profile. Further, in some embodiments, contacts stored in user accounts module may include telephone numbers (i.e., public switched telephone network ("PSTN" contacts), usernames and other information associated with third party messaging networks, and internal user accounts associated with first party messaging networks. Further still, in some embodiments, user accounts module 368 may store devices belonging to a particular user account and/or user profile.

In some embodiments, user accounts module 368 may store entity names that were assigned by a user to represent any nicknamed device that the user sees fit. For instance, a device located in the bedroom of a family member named "Aaron" may receive the entity name "Aaron," "Aaron's Room," "Aaron's Echo," "Aaron's Echo Show," "Aaron's Echo Dot," "Superstar," or any other entity name assigned by a user to represent the device. User accounts 368 may also store a list of users associated with the nicknamed devices.

In some embodiments, user accounts module 368 may store entity names that were assigned to represent any group of contacts and/or devices. For instance, a user may collec-tively assign PSTN contacts (i.e., telephone contacts) of his or her family members the entity name "Home," "Family," or any other entity name. As another example, a user may collectively assign devices belonging to his or her user account (each of which belonging to himself/herself and/or a member of his/her family) the entity name "Home," "Family," or any other entity name. As another example, user accounts module 368 may store a combination of PSTN contacts, devices, and first party messaging contacts collectively as one entity name.

Persons of ordinary skill in the art will recognize that although each of ASR module 358, NLU module 360, speechlets module 362, TTS module 364, and user accounts module 368 may each include instances of processor(s) 352, storage/memory 354, and communications circuitry 356, and those instances of processor(s) 352, storage/memory 354, and communications circuitry 356 within each of ASR module 358, NLU module 360, speechlets module 362, TTS module 364, and user accounts module 368 may differ. For example, the structure, functionality, and style of processor(s) 352 within ASR module 358 may be substantially similar to the structure, functionality, and style of processor(s) 352 within NLU module 360, however the actual processor(s) 352 need not be the same entity.

Figure 4:
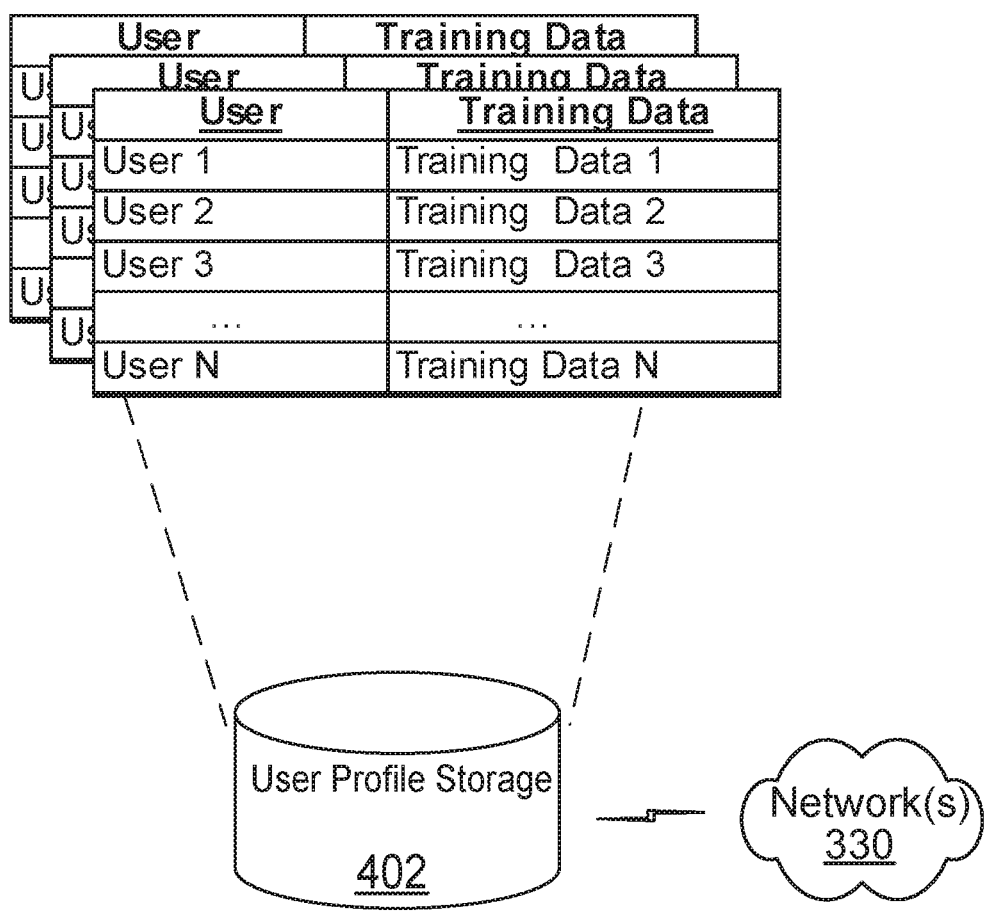
FIG. 4 illustrates data stored and associated with speaker profiles, in accordance with various embodiments of the present disclosure.

FIG. 4 illustrates a user profile storage 402 that includes data regarding users of a device. The user profile storage 402 may be located proximate to the processors/server(s) 352, or may otherwise be in communication with various components of system 300, for example over the network 330. The user profile storage 402 may include a variety of information related to individual users, accounts, etc. that interact with system 300. In an example, the user profile storage 402 is a cloud-based storage. For illustration, as shown in FIG. 4, the user profile storage 402 may include data regarding multiple users of a single speech-controlled device 100a (or other device). Each user indicated in a user profile associated with a speech-controlled device 100a may be associated with training data corresponding to training spoken utterances of the respective user, such as training data 705 discussed below. In addition or alternatively, each user indicated in the user profile associated with a speech-controlled device 100a may be associated with feature/vector data corresponding to training data of the respective user. Further, each user may have a user ID that identifies the specific user for further system processing.

Figure 5:
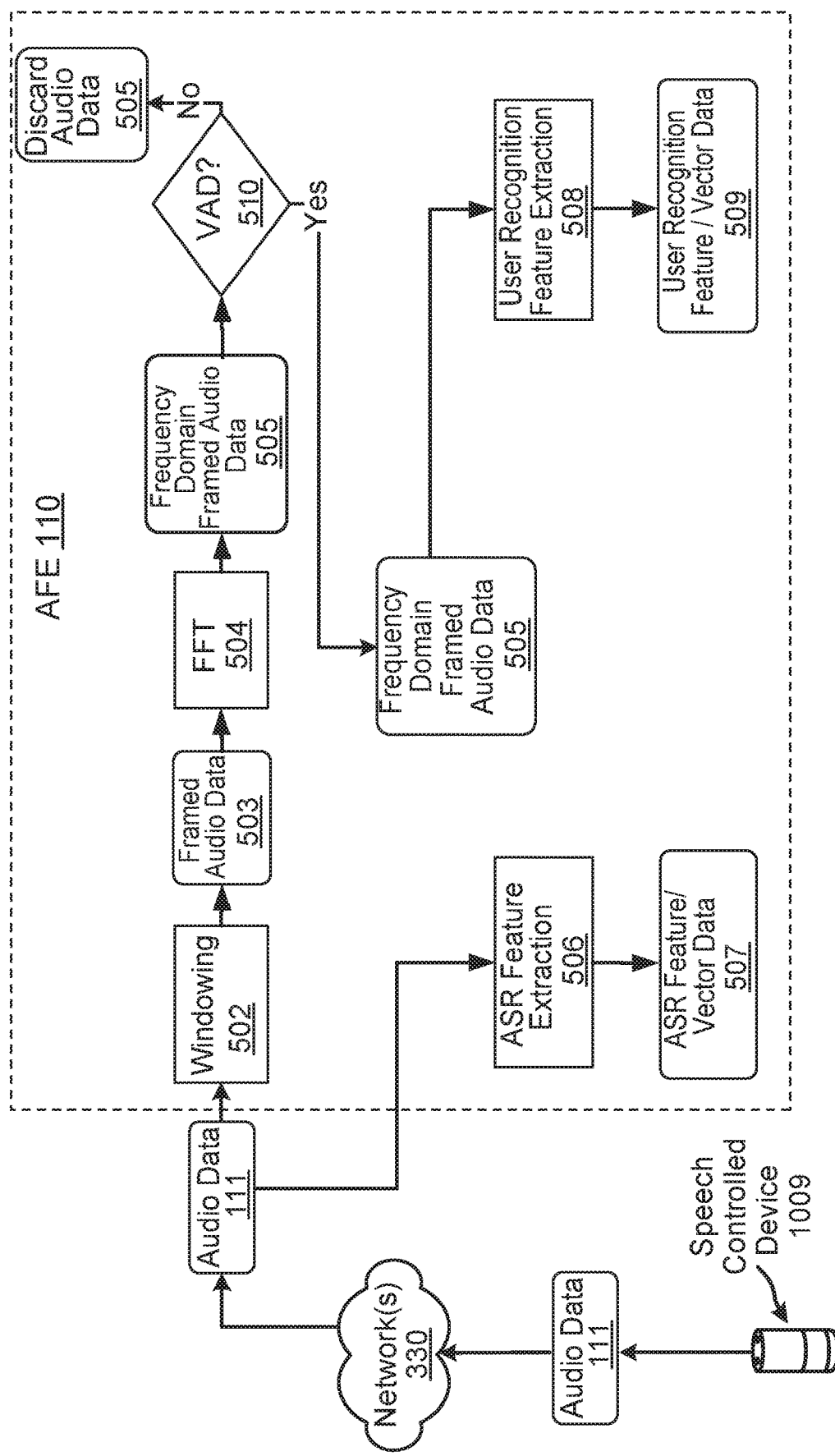
FIG. 5 is a flow diagram illustrating processing performed to prepare audio data for ASR and user recognition, in accordance with various embodiments of the present disclosure.

FIG. 5 illustrates processing performed to prepare audio data for ASR module 358 and user recognition. The speech-controlled device 100a sends audio data 111 through a network(s) 330 to the server(s) 352 for processing. The server(s) 352 may include an acoustic front end (AFE) 110 (or other component(s)) that performs various functions on the incoming audio data 111 to prepare the incoming audio data 111 for further downstream processing, such as ASR and/or user recognition. For example, the AFE 110 may perform (502) windowing functions on the audio data 111 to create framed audio data 503 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 110 may then perform (504) a fast Fourier transform (FFT) that converts the waveforms in each frame of the framed audio data 503 from its original domain (e.g., time) to a representation in a frequency domain (thereby creating frequency domain framed audio data 505). Audio processing techniques other than or in addition to FFT may be used to transform audio data (e.g., waveforms) into data that can be processed as needed.

The processors/server(s) 352 (through the AFE 110 or using another component) then detects (510) whether voice activity (i.e., speech) is present in the post-FFT waveforms (i.e., frequency domain framed audio data 505). In doing so the processors/server(s) 352 may perform VAD operations discussed above. The VAD detector 510 (or other components) may also be configured in a different order, for example the VAD detector 510 may operate on input audio data 111 rather than on frequency domain framed audio data 505, may operate on ASR features, etc. Various different configurations of components are possible. If there is no speech in the audio data, the processors/server(s) 352 discards the frequency domain framed audio data 505 (i.e., removes the audio data from the processing stream). If, instead, the processors/server(s) 352 detects speech in the frequency domain framed audio data 505, the processors/server(s) 352, performs user recognition feature extraction (508) on the frequency domain framed audio data 505. User recognition feature extraction (508) may include performing frame level feature extraction and/or utterance level feature extraction.

The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature/vector data 509). The feature extraction may continue until voice activity is no longer detected in the input audio data, at which point the processors/server(s) 352 may determine that an endpoint of the speech has been reached processing with respect thereto. ASR feature extraction (506) may be performed on all the audio data 111 received from the speech-controlled device 100*a*. Alternatively (not illustrated), ASR feature extraction (506) may only be performed on audio data including speech (as indicated by the VAD 510). ASR feature extraction (506) and user recognition feature extraction (508) involve determining values (i.e., features) representing qualities of the frequency domain framed audio data 505, along with quantitating those features into values (i.e., feature vectors or audio feature vectors). ASR feature extraction (506) may determine ASR feature/vector data 507 useful for ASR processing, and user recognition feature extraction (508) may determine user recognition feature/vector data 509 useful for user recognition. The ASR feature/vector data 507 and the user recognition feature/vector data 509 may be the same features/vectors, different features/vectors, or may include some overlapping features/vectors. A number of approaches may be used to extract features/vectors from the frequency domain framed audio data 505, such as MFCCs, PLP techniques, neural network feature vector techniques, linear discriminant analysis, semi-tied covariance matrices, or other approaches known to those skilled in the art.

Typically, the ASR feature/vector data 507 may include a different audio feature vector for each audio frame. Thus, for one 25 ms long audio frame, the ASR feature extraction component 506 may output a single ASR feature vector. The ASR feature vectors 507 output by the ASR feature extraction component 506 may be output to an ASR module 358 to perform speech recognition.

Depending on system configuration, the user recognition feature extraction component 508 may output multiple user recognition feature vectors, for example one such vector for each audio frame. Alternatively, the user recognition feature extraction component 508 may continue to input the frequency domain framed audio data 505 while the utterance is ongoing (e.g., before the endpoint of the speech is reached in the audio data 505). While the audio data 505 for the utterance is input, the user recognition feature extraction component 508 may accumulate or otherwise combine the audio data 505 as it comes in. That is, for a certain frame's worth of audio data 505 that comes in, the user recognition feature extraction component 508 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 508 may depend on what audio qualities are determined to be important for ultimate user recognition. Thus, the user recognition feature extraction component 508 may be trained to isolate and process data that is most useful for user recognition. The output of the user recognition feature extraction component 508 may thus include user recognition feature/vector data 509 that includes values for features useful for user recognition. The resulting user recognition feature/vector data 509 may then be used for user recognition.

Figure 6:
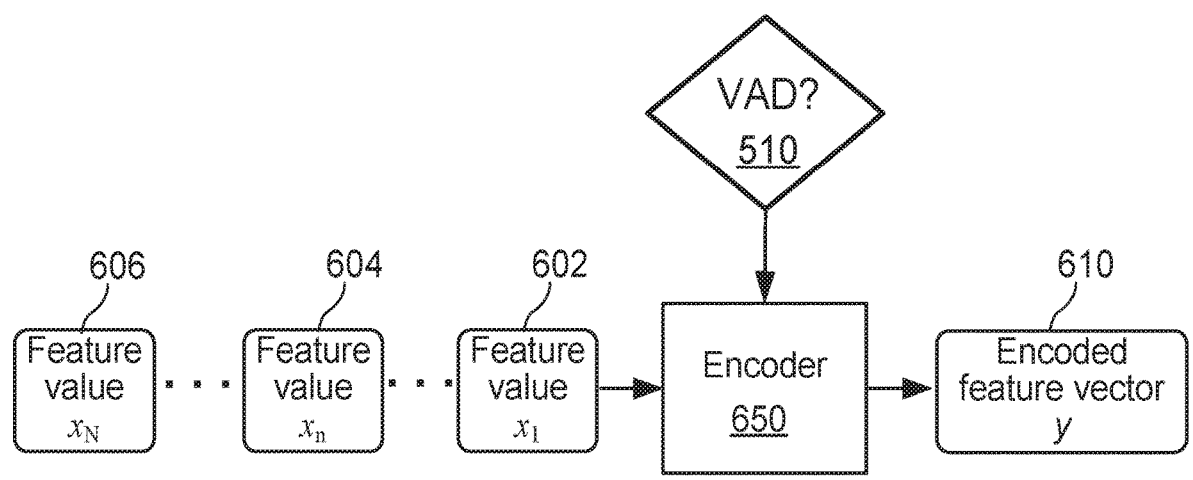
FIG. 6 is a diagram of a vector encoder, in accordance with various embodiments of the present disclosure.

The user recognition feature/vector data 509 may include multiple vectors each corresponding to different portions of the input utterance. Alternatively, the user recognition feature/vector data 509 may be a single vector representing audio qualities of the input utterance. Referring to FIG. 6, the single vector may be created using an encoder 650 which can create a fixed-size vector to represent certain characteristics of the audio data entities as described below. In mathematical notation, given a sequence of feature data values $x_1, \ldots x_n, \ldots x_N$, with $x_n$ being a D-dimensional vector, an encoder $E(x_1, \ldots x_N) = y$ projects the feature sequence to y, with y being a F-dimensional vector. F is a fixed length of the vector and is configurable depending on use of the encoded vector and other system configurations. As shown in FIG. 6, feature values 602 through 606 (which may include feature vectors of audio data 111, frequency domain framed audio data 505, or the like) may be input into an encoder 650 which will output an encoded feature vector 610 that represents the input feature values.

The VAD 510 may be an input into the encoder 650 such that the encoder 650 may only operate when feature values input therein correspond to speech. The individual feature values (e.g., 602-606) may correspond to specific audio frames. Regardless of how many feature values are input, any particular encoder 650 will be configured to output vectors of the same size, thus ensuring a continuity of output encoded vector size from any particular encoder 650 (though different encoders may output vectors of different fixed sizes) and enabling comparing different feature vectors y. The value y may be called an embedding of the sequence $x_N$. The length of $x_n$ and y are fixed and known a-priori, but the length of N of feature sequence $x_1, \ldots x_N$ is not necessarily known a-priori. The encoder E may be implemented as a neural network (NN), recurrent neural network (RNN), GMM, or other model. One particular example is a long short-term memory (LSTM) RNN. There are a variety of ways for the encoder 650 to consume the encoder input, including but not limited to:

linear, one direction (forward or backward),
 bi-linear, essentially the concatenation of a forward and a backward embedding, or
 tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 6 illustrates operation of the encoder 650. The input feature value sequence, starting with feature value $x_1$ 602, continuing through feature value $x_n$ 604 and concluding with feature value $x_N$ 606 is input into the encoder 650. The encoder 650 may process the input feature values as noted above. The encoder 650 outputs the encoded feature vector y 610, which is a fixed length feature vector of length F. Thus, the user recognition feature extraction component 508 may include an encoder 650 that receives audio feature values for a particular utterance as input, and outputs a fixed length encoded feature vector y 610, which may be the user recognition feature/vector data 509. Thus, in certain system configurations, no matter how long the utterance is, or how many acoustic frames worth of feature values are input into the encoder 650, the output feature vector 610/509 will be of the same length, thus allowing for more ease of performing user recognition by the user recognition module. To allow for robust system operation a final vector 509 may include many dimensions (e.g., several hundred), thus providing many data points for downstream consideration.

To determine the user recognition feature/vector data 509, the system may (for example using VAD detector 510) determine that voice activity is detected in input audio. This may indicate the beginning of the utterance, thus resulting in the system determining that the input utterance starts at a first point in audio data. Audio processing (for example by windowing 502, FFT 504, ASR feature extraction 506, user recognition feature extraction 508, ASR module 355, or the like) may continue on the utterance audio data starting at the first point and continuing until the VAD detector 510 determines that voice activity is no detected at a second point in audio data. Thus, the system may determine that the input utterance ends at the second point. Thus, the first point may be considered the beginpoint of the utterance and the second point may be considered the endpoint of the utterance. The VAD detector 510, or other component, may signal the user recognition feature extraction component 508 when the beginpoint and/or endpoint is detected so that the user recognition feature extraction component 508 may begin processing audio data starting at the beginpoint and ending at the endpoint. Further, audio frames during the utterance that do not include speech may be filtered out by the VAD detector 510 and thus not considered by the ASR feature extraction 506 and/or user recognition feature extraction 508. The resulting accumulated/processed speech audio data for the utterance (from beginpoint to endpoint) may then be represented in a single feature vector for the user verification feature/vector data 509, which may then be used for user recognition.

Figure 7:
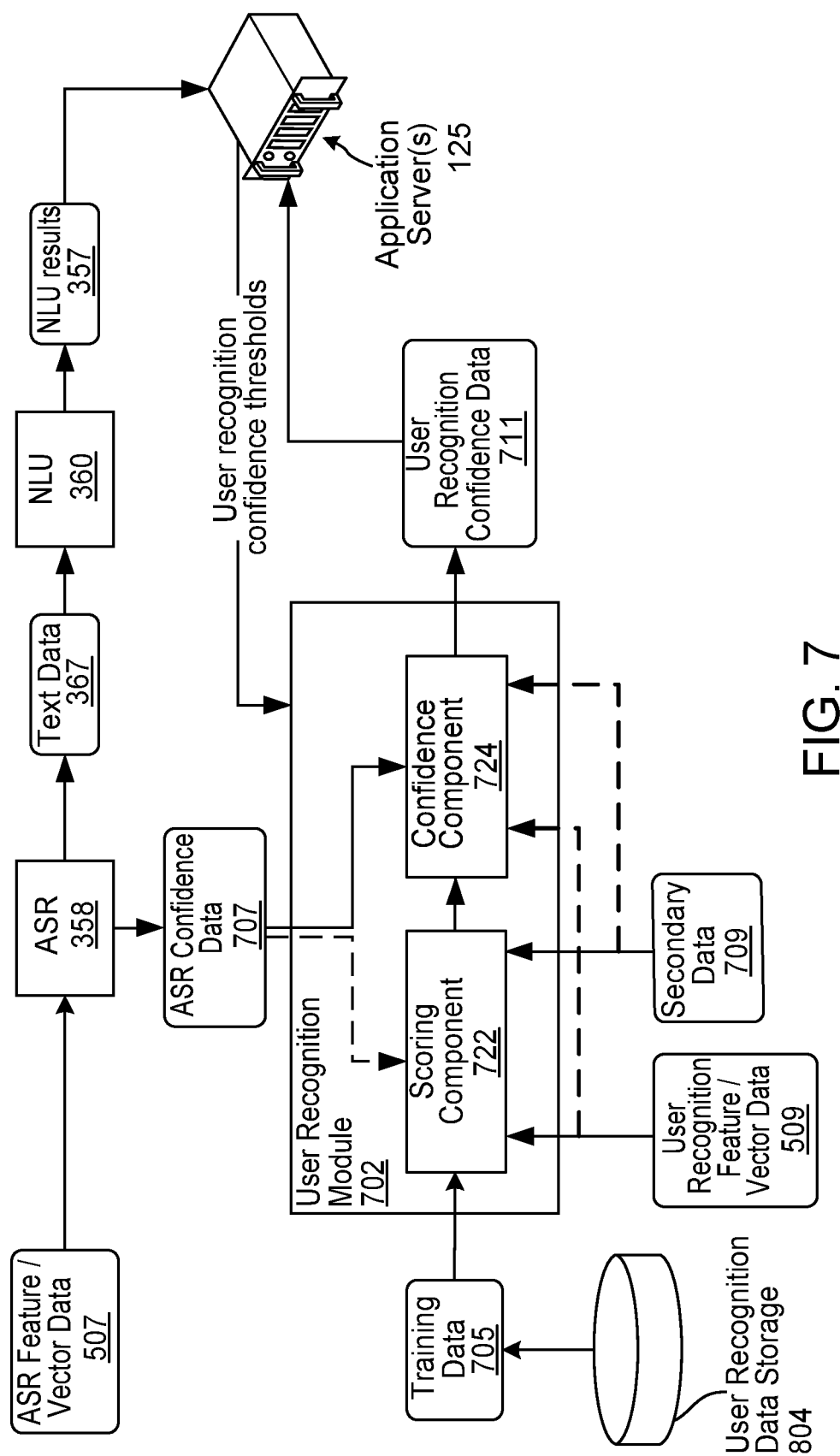
FIG. 7 is a system flow diagram illustrating user recognition, in accordance with various embodiments of the present disclosure.

FIG. 7 illustrates user verification as performed by the processors/server(s) 352. The ASR module 358 performs ASR on the ASR feature/vector data 507 as described above. ASR output (i.e., text data 367) is then processed by the NLU module 360 as described above. The ASR confidence data 707 may then be passed to a user recognition module 702.

The user recognition module 702 of the processors/server(s) 352 performs user recognition using various data including the user recognition feature/vector data 509 and training data 705 which may correspond to sample audio data corresponding to known users, the ASR confidence data 707 and secondary data 709. The user recognition module 702 may then output user recognition confidence data 711 which reflects a certain confidence that the input utterance was spoken by one or more particular users. The user recognition confidence data 711 may not indicate access privileges of the user(s). The user recognition confidence data 711 may include an indicator of the verified user (such as a user ID corresponding to the speaker of the utterance) along with a confidence value corresponding to the user ID, such as a numeric value or binned value as discussed below.

The training data 705 may be stored in a user recognition data storage 704. The user recognition data storage 704 may be stored by the processors/server(s) 352, or may be a separate device. Further, the user recognition data storage 704 may be part of user profile storage 402. The user recognition data storage 704 may be a cloud-based storage. The training data 705 stored in the user recognition data storage 704 may be stored as waveforms and/or corresponding features/vectors. The training data 705 may correspond to data from various audio samples, each audio sample associated with a known user and/or user identity. For example, each user known to the system may be associated with some set of training data 705 for the known user. The user recognition module 702 may then use the training data 705 to compare against incoming audio data (represented by user recognition feature/vector data 509) to determine the identity of a user speaking an utterance. The training data 705 stored in the user recognition data storage 704 may thus be associated with multiple users of multiple devices. Thus, the training data 705 stored in the storage 704 may be associated with both a user that spoke the respective utterance, as well as the speech-controlled device 100a that captured the respective utterance.

The training data 705 for a particular user may include a feature vector of the same size as a vector of the user recognition feature/vector data 509. Thus, for example, if a feature vector 509 is of size F (for example encoded by encoder 650), the training data 705 may also be a feature vector of size F. To create such a training data feature vector, during a training period the system may either prompt a user to speak sample audio data or may identify sample audio data known to have been spoken by a particular user. The system may then process the sample audio data (for example into feature values such as 602-606 and then by encoder 650) to create sample training data 705 (e.g., a feature vector of size F). The training data 705 may then be stored by the system (such as in data storage 704) and saved for use during runtime user verification processing.

To perform user recognition, the user recognition module 702 may determine the speech-controlled device 100a from which the audio data 111 originated. For example, the audio data 111 may include a tag indicating the speech-controlled device 100a. Either the speech-controlled device 100a or the processors/server(s) 352 may tag the audio data 111 as such. The tag indicating the speech-controlled device 100a may be associated with the user recognition feature/vector data 509 produced from the audio data 111. The user recognition module 702 may send a signal to the user recognition data storage 704, with the signal requesting only training data

705 associated with known users of the speech-controlled device 100*a* from which the audio data 111 originated. This may include accessing a user profile associated with the speech-controlled device 100*a* and then only inputting training data 705 associated with users corresponding to the user profile of the device 100*a*. This limits the universe of possible training data the recognition module 702 should consider at runtime when verifying a user and thus decreases the amount of time to perform user recognition by decreasing the amount of training data 705 needed to be processed. Alternatively, the user recognition module 702 may access all (or some other subset of) training data 705 available to the system. However, accessing all training data 705 will likely increase the amount of time needed to perform user recognition based on the magnitude of training data to be processed.

If the user recognition module 702 receives training data 705 as an audio waveform, the user recognition module 702 may determine features/vectors of the waveform(s) or otherwise convert the waveform into a data format that can be used by the user recognition module 702 to actually perform the user recognition. The user recognition module 702 may then recognize the user that spoke the utterance in the audio data 111 by comparing features/vectors of the user recognition feature/vector data 509 to training features/vectors (either received from the storage 704 or determined from training data 705 received from the storage 704).

The user recognition module 702 may include a scoring component 722 which determines respective scores indicating whether the input utterance (represented by user recognition feature/vector data 509) was spoken by particular users (represented by training data 705). The user recognition module 702 may also include a confidence component 724 which determines an overall confidence as the accuracy of the user recognition operations (such as those of the scoring component 722) and/or an individual confidence for each user potentially identified by the scoring component 722. The output from the scoring component 722 may include scores for all users with respect to which user recognition was performed (e.g., all users associated with the speech-controlled device 100*a*). For example, the output may include a first score for a first user, a second score for a second user, and third score for a third user, etc. Although illustrated as two separate components, the scoring component 722 and confidence component 724 may be combined into a single component or may be separated into more than two components.

The scoring component 722 and confidence component 724 may implement one or more trained machine learning models (such neural networks, classifiers, etc.) as known in the art. For example, the scoring component 722 may use probabilistic linear discriminant analysis (PLDA) techniques. PLDA scoring determines how likely it is that the input user recognition feature vector 509 corresponds to a particular training data feature vector 705 for a particular user. The PLDA scoring may generate similarity scores for each training feature vector considered and may output the list of scores and users and/or the user ID of the speaker whose training data feature vector most closely corresponds to the input user recognition feature vector 509 of the utterance. The scoring component 722 may also use other techniques such as GMMs, generative Bayesian models, or the like, to determine similarity scores.

The confidence component 724 may input various data including information about the ASR confidence 707, utterance length (e.g., number of frames or time of the utterance), audio condition/quality data (such as signal-to-interference data or other metric data), fingerprint data, image data, or other factors to consider how confident the user recognition module 702 is with regard to the scores linking users to the input utterance. The confidence component 724 may also consider the similarity scores and user IDs output by the scoring component 722. Thus, the confidence component 724 may determine that a lower ASR confidence 707, or poor input audio quality, or other factors, may result in a lower confidence of the user recognition module 702. Whereas a higher ASR confidence 707, or better input audio quality, or other factors, may result in a higher confidence of the user recognition module 702. Precise determination of the confidence may depend on configuration and training of the confidence component 724 and the models used therein. The confidence component 724 may operate using a number of different machine learning models/techniques such as GMM, neural networks, etc. For example, the confidence component 724 may be a classifier configured to map a score output by the scoring component 722 to a confidence.

The user recognition module 702 may output user recognition confidence data 711 specific to a single user. The user recognition confidence data 711 may include a particular score (e.g., 0.0-1.0, 0-1000, or whatever scale the system is configured to operate). Alternatively or in addition, the user recognition confidence data 711 may include a binned recognition indicator. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Combined binned and confidence score outputs are also possible. The user recognition module 702 may also output a confidence value that the score/bin is correct, where the confidence value indicates how confident the user recognition module 702 is in the output results. This confidence value may be determined by the confidence component 724.

The confidence component 724 may determine individual user confidences and differences between user confidences when determining the user recognition confidence data 711. For example, if a difference between a first user's confidence score and a second user's confidence score is large, and the first user's confidence score is above a threshold, then the user recognition module 702 is able to recognize the first user as the user that spoke the utterance with a much higher confidence than if the difference between the users' confidences were smaller.

The user recognition module 702 may perform certain thresholding to avoid incorrect user recognition results being output. For example, the user recognition module 702 may compare a confidence score output by the confidence component 724 to a confidence threshold. If the confidence score is not above the confidence threshold (for example, a confidence of "medium" or higher), the user recognition module 702 may not output user recognition confidence data 711, or may only include in that data 711 an indication that a user speaking the utterance could not be verified. Further, the user recognition module 702 may not output user recognition confidence data 711 until enough user recognition feature/vector data 509 is accumulated and processed to recognize the user above a threshold confidence. Thus the user recognition module 702 may wait until a sufficient threshold quantity of audio data of the utterance has been processed before outputting user recognition confidence data 711. The quantity of received audio data may also be considered by the confidence component 724.

The user recognition module 702 may be defaulted to output binned (e.g., low, medium, high) user recognition confidence data 711. However, such may be problematic from the application server(s) 125 perspective. For example, if the user recognition module 702 computes a single binned confidence for multiple users, the application server(s) 125 may not be able to determine which user to determine content with respect to. In this situation, the user recognition module 702 may be configured to override its default setting and output user recognition confidence data 711 including numeric values (e.g., 0.0-1.0) associated with the users associated with the same binned confidence. This enables the application server(s) 125 to select content associated with the user associated with the highest confidence value. The user recognition confidence data 711 may also include the user IDs corresponding to the potential user(s) who spoke the utterance.

The NLU results 357 may invoke multiple application servers 125 having access to content responsive to a spoken utterance. The processors/server(s) 352 may communicate with one or more of the application servers 125 without having to use a network(s) 330. Alternatively, the processors/server(s) 352 may communicate with one or more of the application servers 125 through a network(s) 330.

Each application server 125 may have a respective user recognition confidence threshold that must be satisfied prior to the application server 125 providing content responsive to the spoken utterance in the audio data 111. The application server(s) 125 may individually send a request for user recognition data to the user recognition module 702. Each request may include the user recognition confidence threshold of the application server 125 from which the request originated/was sent. Alternatively, a component of the processors/server(s) 352 may compile the user recognition confidence thresholds of all the application servers 125 invoked by a spoken utterance, and may send all the user recognition confidence thresholds to the user recognition module 702 in a single transmission. The user recognition confidence thresholds may be in the form of numeric confidence values (e.g., 0.0-1.0, 0-1000) or confidence indicators (e.g., low, medium, high). All of the user recognition confidence thresholds sent to the user recognition module 702 may be confidence values, all of the user recognition confidence thresholds sent to the user recognition module 702 may be in the form of confidence indicators, or some of the user recognition confidence thresholds sent to the user recognition module 702 may be in the form of confidence values while others are in the form of confidence indicators.

The user recognition module 702 may determine user recognition confidence data 711 with respect to all of the users indicated in the profile associated with the speech-controlled device 100a. The user recognition module 702 may then determine whether one or more users are associated with user recognition confidence data 711 satisfying a most stringent (e.g., highest) received user recognition confidence threshold. If the user recognition module 702 determines a single user is associated with user recognition confidence data 711 that meets or exceeds the highest user recognition confidence threshold, the user recognition module 702 sends the user recognition confidence data 711 to the application servers 125 from which the user recognition confidence thresholds were received.

If the user recognition module 702 does not determine a user associated with user recognition confidence data 711 that meets or exceeds the highest user recognition confidence threshold, the user recognition module 702 may cause speech-controlled device 100a (and/or a different devices indicated in profiles associated with the users indicated in the speech-controlled device's profile) to gather additional data usable for user recognition. Such additional data may include image data or video data that may be used for facial recognition, for example. Such additional data may also include biometric data such as retina image data captured using a retina scanner and used for retina verification. Moreover, such additional data may include biometric data such as fingerprint data captured using a fingerprint scanner and used for fingerprint verification. Other user identifying data may also be used. The user recognition module 702 may perform user recognition using additional data until the user recognition module 702 determines a single user (indicated in the profile associated with the speech-controlled device 100a) associated with user recognition confidence data 711 that meets or exceeds the highest user recognition confidence threshold. Likewise, if the user recognition module 702 determines more than one user associated with user recognition confidence data 711 that meets or exceeds the highest user recognition confidence threshold, the user recognition module 702 uses additional data (described above) to perform user recognition until only a single user is associated with user recognition confidence data 711 that meets or exceeds the highest user recognition confidence threshold.

In addition, the user recognition module 702 may use secondary data 709 to inform user recognition processing. Thus, a trained model or other component of the user recognition module 702 may be trained to take secondary data 709 as an input feature when performing recognition. Secondary data 709 may include a wide variety of data types depending on system configuration and may be made available from other sensors, devices, or storage such as user profile data, etc. The secondary data 709 may include a time of day at which the audio data was captured, a day of a week in which the audio data was captured, the text data 367, and/or the NLU results 357.

The processors/server(s) 352 may receive the secondary data 709 from various devices local to the user (e.g., the speech-controlled device 100a, a smart phone, a biometric sensor, etc.). The secondary data 709 received may depend upon the situation of the user's environment. For example, if multiple individuals are located proximate to the devices(s) (e.g., as determined by multiple individuals being located within a field of view of the camera 314 or based on multiple individuals' voices being detected in audio data captured by the microphone 308), the processors/server(s) 352 may receive secondary data 709 corresponding to a passcode, biometric content, or other content that may not be overheard/overseen by the other individuals. The passcode may be provided via a touch interface of a smart device (such as a smart phone, tablet, etc.). The biometric content may be a fingerprint captured by a fingerprint scanner, an image(s) of a retina captured by a retina scanner, etc. In another example, if multiple individuals are located around the user, the secondary data 709 may only be a portion of a passcode. A user profile may indicate an alphanumeric passcode and the processors/server(s) 352 (or another device) may solicit only a portion (e.g., the third digit) of the passcode from the user. These techniques may be beneficial if it is determined that multiple individuals are present because it allows the user to provide useful verification data without having the user divulge confidential information to unauthorized individuals.

Each form of secondary data 709 (e.g., image data for retina verification, passcode data, etc.) may be associated with a respective score/weight, or generally the determined confidence data 711 may depend on the available forms of secondary data and their respective scores, if any. For example, a user recognition performed using retina scan data may increase a confidence data, but the amount of increase may depend on a score associated with the retina scan data (e.g., a score from a retina scan component that produces retina scan data). Thus, it should be appreciated that different forms of secondary data 709 may affect user recognition determinations differently.

A profile associated with each user may include reference secondary data (i.e., reference retina image data, reference fingerprint image data, etc.) to which captured secondary data 709 is compared for purposes of user recognition. Moreover, each user profile may include reliability weight information associated with each type of secondary data 709. The reliability weight information may be specific to the device configured to capture the secondary data. For example, if the user has two different retina scanners, a first retina scanner may have be associated with a first reliability weight and a second retina scanner may be associated with a second reliability weight. If the user recognition module 702 determines initial user recognition confidence data 711 that does not satisfy the most stringent user recognition confidence threshold, the user recognition module 702 may cause secondary data 709 to be captured thereafter, and may use the secondary data 709 to determine updated user recognition confidence data 711.

In one example, secondary data 709 may include image data or video data. For example, facial recognition may be performed on image data or video data received from the speech-controlled device 100*a* from which the audio data 111 was received. Facial recognition may be performed by the user recognition module 702, or another component of the processors/server(s) 352. The output of the facial recognition process may be used by the user recognition module 702. That is, facial recognition output data may be used in conjunction with the comparison of the features/vectors of the audio data 111 and training data 705 to perform more accurate user recognition. Thus, while training data 705 may be based on speech samples of a user, the training data 705 may also be based on other data such as image data corresponding to known pictures of the user, retina scan data corresponding to the user, fingerprint data, etc.

The secondary data 709 may also include location data of the speech-controlled device 100*a*. The location data may be specific to a building within which the speech-controlled device 100*a* is located. For example, if the speech-controlled device 100*a* is located in user A's bedroom, such location may increase user recognition confidence data associated with user A, but decrease user recognition confidence data associated with user B.

The secondary data 709 may further include type data indicating a type of the speech-controlled device 100*a*. Different types of speech-controlled devices may include, for example, a smart watch, a smart phone, a tablet computer, and a vehicle. The type of the speech-controlled device 100*a* may be indicated in a profile associated with the speech-controlled device 100*a*. For example, if the speech-controlled device 100*a* from which the audio data 111 was received is a smart watch or vehicle belonging to user A, the fact that the speech-controlled device 100*a* belongs to user A may increase user recognition confidence data associated with user A, but decrease user recognition confidence data associated with user B.

The secondary data 709 may additionally include geographic coordinate data associated with the speech-controlled device 100*a*. For example, a profile associated with a vehicle may indicate multiple users (e.g., user A and user B). The vehicle may include a global positioning system (GPS) indicating latitude and longitude coordinates of the vehicle when the audio data 111 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the speech-controlled device 100*a*. The global coordinates and associated locations may be associated with respective users in the user profile.

The secondary data 709 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 709 and considered by the user recognition module 702. If a mobile device (such as a phone, Tile, dongle, or other device) known to be associated with a particular user is detected proximate to (for example physically close to, connected to the same Wi-Fi network as, or otherwise nearby) the speech-controlled device 100*a*, this may be reflected in the secondary data 709 and considered by the user recognition module 702.

Depending on system configuration, the secondary data 709 may be configured to be included in the vector representation of the user recognition feature/vector data 509 (for example using encoder 650) so that all the data relating to the utterance to be processed by the scoring component 722 may be included in a single vector. Alternatively, the secondary data 709 may be reflected in one or more different data structures to be processed by the scoring component 722.

As shown in FIG. 7, the ASR module 358 may output text data 367, which in turn is processed by the NLU component 360. The results 357 of NLU processing performed by the NLU module 360 and the user recognition confidence data 711 output by the user recognition module 702 may be sent to one or more applications, represented by application server(s) 125. The NLU results 357 and the user recognition confidence data 711 may be sent simultaneously (i.e., in a single transmission) to the application server(s) 125 via an application program interface (API). Alternatively, the NLU results 357 and the user recognition confidence data 711 may be sent in consecutive transmissions to the application server(s) 125 via the API. The application server(s) 125 that receives the NLU results 357 and the user recognition confidence score data 711 may be determined by the processors/server(s) 352 as corresponding to content responsive to the utterance in the audio data 111. For example, if the audio data 111 includes the utterance "Play my music," the NLU results 357 and user recognition confidence data 711 may be sent to a music playing application server 125. If user recognition confidence data 711 associated with a single user is passed to the application server(s) 125, the application server(s) 125 may identify content responsive to the utterance and associated with the user. If, instead, user recognition confidence score data 711 associated with multiple users is passed to the application server(s) 125, the application server(s) 125 may identify content responsive to the utterance and associated with the user associated with the highest recognition confidence.

The API used to pass the user recognition confidence data 711 to the application server(s) 125 may allow the application server(s) 125 to receive various information such a user ID as well as a confidence value corresponding to the user ID, such as a numeric value or binned value as discussed herein. The API may also pass data corresponding to or representing the confidence value such as a binned value discussed herein or other data, numeric or otherwise representing the confidence. The API may also pass other data such as a source of user recognition data (e.g., whether the system recognized the user using speech analysis, a passcode, a passphrase, a fingerprint, biometric data, etc. or some combination thereof). The API may also pass data such as other user profile information, a speech session identifier (so the various components can track the speech session corresponding to the data) or other information. The speech session identifier may correspond to an utterance spoken by a user and/or to an ongoing exchange between the system and the user (such as a dialog of multiple utterances) to exchange information for executing a command. The API, or one or more other APIs, may also be used to exchange the user recognition confidence thresholds sent from the application server(s) 125 to the user recognition module 702 as well as other data such as requested specific sources of user recognition data, user IDs, speech session IDs, requested content data, or other information to be exchanged for purposes of processing a speech command/session.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Different content sources may require different user recognition confidence level thresholds be satisfied prior to creating/releasing user specific content. For example, if a user says "What is my bank account balance", an output of the system may ultimately be "Hello John, your Bank A account balance is $500." The portion of the output corresponding to "Hello John" may be created by a TTS content source that requires a user recognition confidence threshold of "low" be satisfied since potentially speaking the wrong user's name in a greeting is not necessarily problematic from a confidentiality perspective. In contrast, the portion of the output corresponding to "your Bank A account balance is $500" may be created using output from a banking content source (e.g., an application server 125) that requires a user recognition confidence threshold of "high" be satisfied because divulging a bank and an account balance of a user to a wrong user is highly problematic from a confidentiality perspective.

Moreover, a single content source may require different user recognition confidence level thresholds be satisfied based on the type/kind of content to be released. For example, a banking application may be configured to create/release bank branch information (e.g., branch locations and times of operation). The banking application may also be configured to release bank account information. The banking application may require a user recognition confidence level of "low" be satisfied to release bank branch information, but may require a user recognition confidence level of "high" be satisfied to release user specific bank account information.

Figure 8:
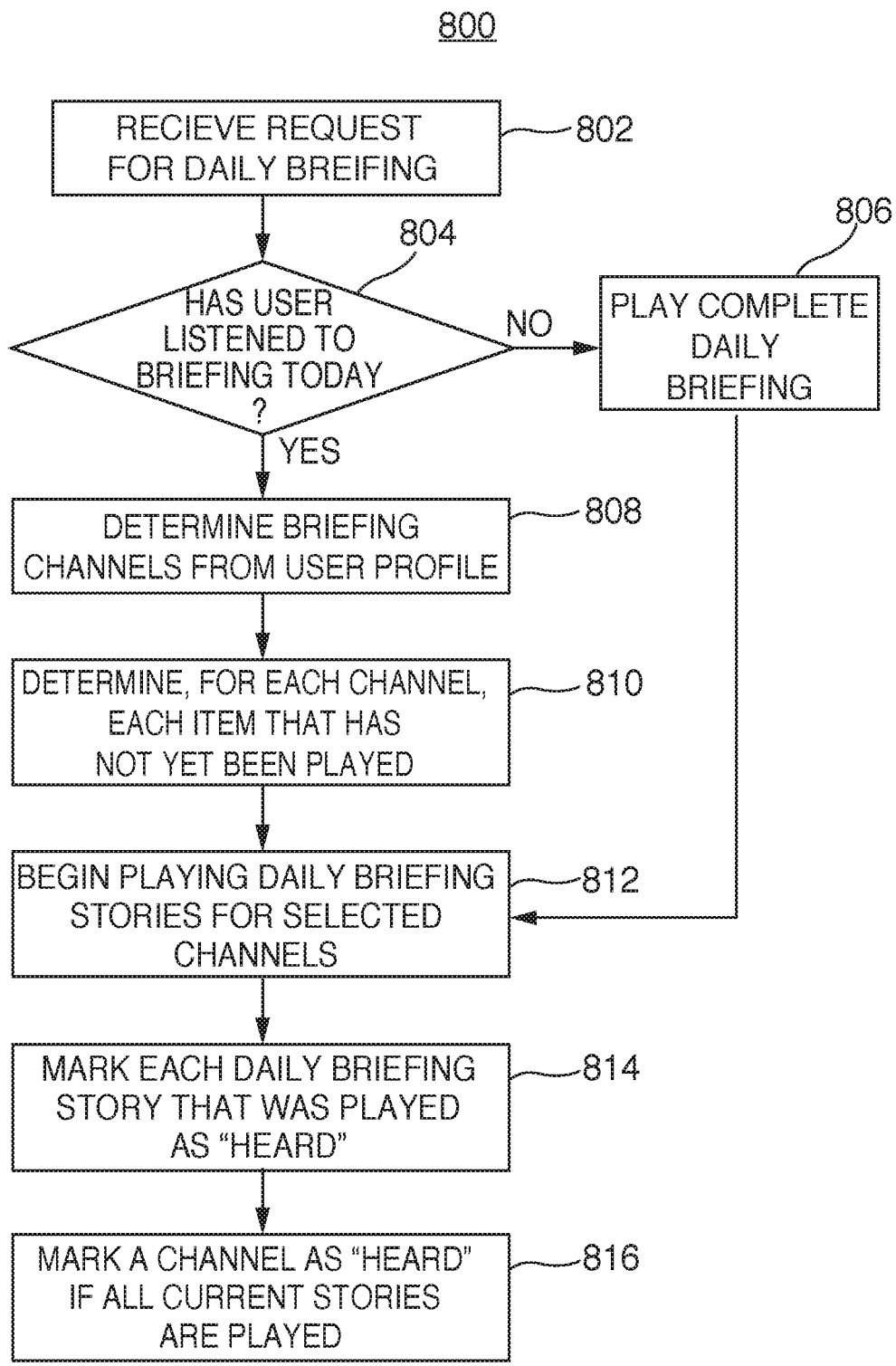
FIG. 8 is an illustrative diagram of a process for determining whether content has been played and for playing unplayed content, in accordance with various embodiments.

FIG. 8 is an illustrative diagram of a process 800 for providing individual users with flash news briefings in accordance with the principles disclosed herein. As described above, while flash news briefing are provided herein as a representative example for purposes of illustration, the principles disclosed herein can and do apply to a wide variety of content provided from a wide variety of sources, such as audio-only, video only, audio-video, presentation of text, etc. Any content that is updated on a regular basis can be provided in a manner whereby the systems and methods described herein can be applied to enable a user to return for later playing of content, whereby the system can provide unplayed content while automatically skipping content that has already been played. Process 800 may begin in step 802 whereby a request for a flash news briefing may be received. As described briefly above, electronic device 100a (which may or may not include a display screen, in addition to the microphone(s) and speaker(s) included therein), is configured to listen for utterances until a wakeword is received. At that time, the utterance is converted to digital audio data representing the utterance, and the digital audio data is passed from electronic device 100a to language processing system 300 via a network interface 330 such as a Wi-Fi interface through the internet. Once language processing system, through ASR and NLU processing, has determined that the intent of the utterance is to request a flash news briefing, step 802 is complete and the flash news briefing process can begin.

In step 804, in accordance with the technical innovations described and discussed herein, a determination is made regarding whether the specific user, such as individuals 1 and 3 shown in FIGS. 1A and 1B, has already listened to a flash news briefing earlier in the day (the relevant time frame to consider can vary, for example, it may be in the past week, the past several days, the past several hours, etc.). If the user has not already listened to the flash news briefing, the complete flash news briefing can begin playing in step 806. If the user has already listened to a flash news briefing, in step 808 the system can attempt to determine which briefing channels the specific user has enabled for flash news briefing. As described above, if the specific user has also enrolled in voice recognition and enabled that feature, the system may quickly recognize the user from the utterance, and access that user's profile in order to determine that user's specific configuration and settings for receiving flash news briefings.

Once the individual channels have been determined (e.g., in the examples shown in FIGS. 1A and 1B, the sources would be source 1, source 2, source 3 and source 4), in step 810, each channel is evaluated in order to determine the "unplayed" briefings, and the system may also determine which "unplayed" briefing is the oldest for each channel in order to try to determine if that specific new item might be stale. In step 812, individual news items can be played back such that some or all of the "unplayed" news items for a specific channel may be played in sequence before moving to a different selected news channel. In step 814, which may occur in conjunction or in parallel with step 812, each news story that is played back is then marked accordingly or designated as having been played back. In step 816, an additional designation may be utilized to indicate that all of the news stories for a specific channel have been heard. This additional designation may improve overall performance and responsiveness by providing a simpler and quicker way to skip a series of news stories that have already been played back.

Figure 9:
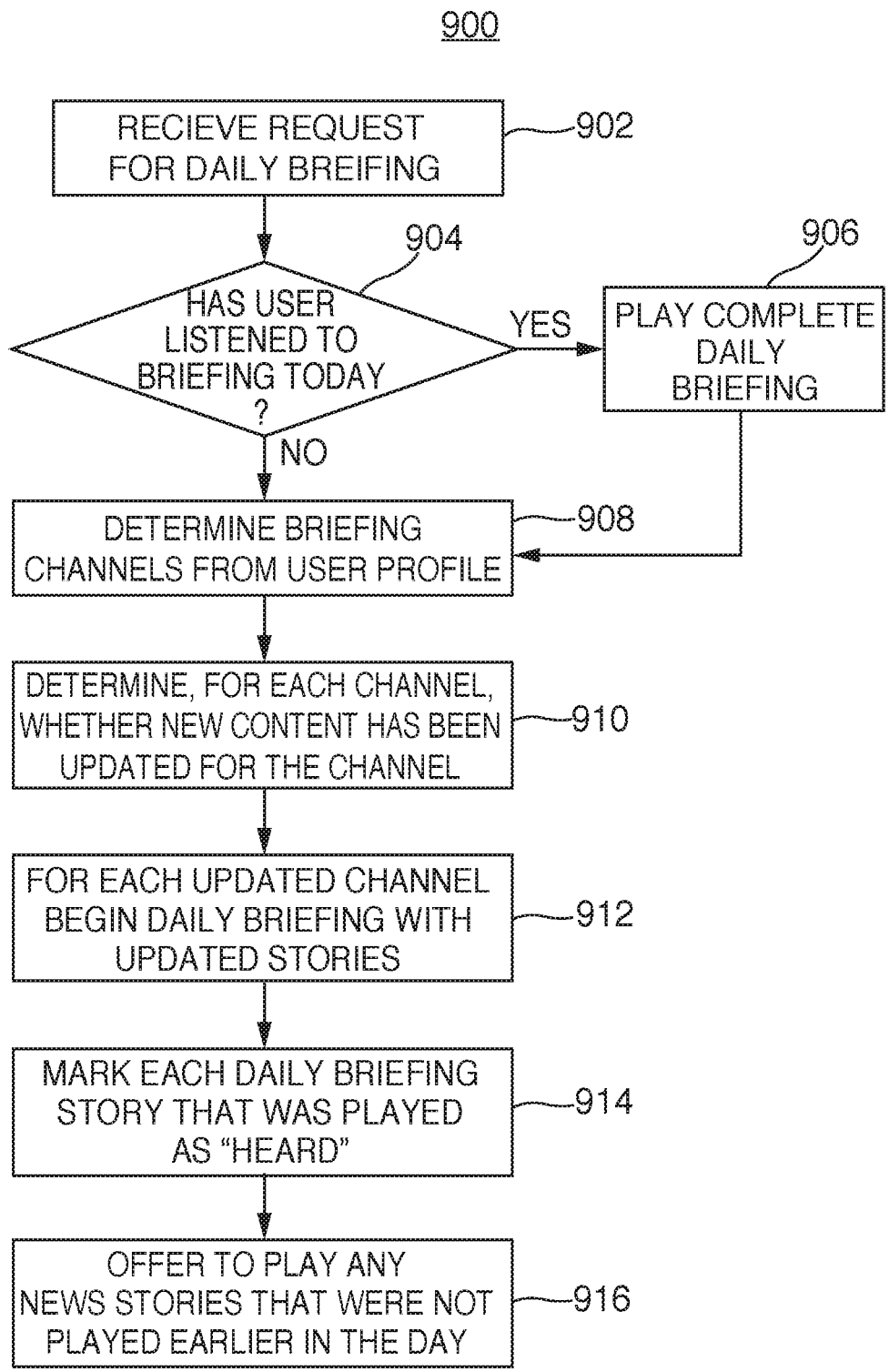
FIG. 9 is an illustrative diagram of a process for dealing with content updates from content providers while providing unplayed content, in accordance with various embodiments.

FIG. 9 is an illustrative diagram of a process 900 for providing flash news briefings in which one or more content channels or providers have updated the available content or news stories in the intervening period between when the previous flash briefing was requested and when the present flash briefing was requested, in accordance with the principles disclosed herein. Process 900 can begin in step 902 when the request for a flash news briefing is received. Step 902 can be substantially similar to step 802 which was described above in detail, and included receiving an utterance by device 100a, which included a wakeword, and communicating with speech recognition system 300 to determine that a flash briefing request was made.

In step 904, a determination is made as to whether the specific user has already received a flash briefing "today" (or within whatever a designated time period is for relevancy to "unplayed" news items). If the user has not already received a flash news briefing, a complete briefing is provided (or at least started playing back) in step 906. If a previous flash briefing has occurred, an inquiry is made to the specific user's profile in order to determine that user's flash briefing settings and preferences. In step 910, the system makes a determination, for each channel enabled by the specific user, as to whether new content has been provided since the previous flash news briefing.

In step 912, if the specific user has configured the system to provide flash news briefings based on added news first, the system can begin playing back each of the news items that have been received from one or more of the news content providers during the intervening period between the current flash news briefing and the previous flash news briefing. In step 914, each news item that is played back is marked or designated as having been played back. If the system completes playing each of the newly added news items, and the specific user did not complete listening to the previous flash news briefing (such that there are additional news items that are designated as "unplayed"), the language processing system, in step 916, can prepare a question for the specific user, and convert that question to digital audio data using text-to-speech sub-system 364, and then playback the question on device 100a which asks the user if the user would like to resume playing the previous flash news briefing. For example, the system might play an audio message using the speaker(s) within device 100a such as "That's all I have for updated news since your last flash briefing. There are still some news items from your last flash briefing, would you like to resume listening to them?"

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method comprising:
   determining a first source and a second source enabled to provide content with respect to a first user account;
   determining, from the first source, a first content item and a second content item;
   determining, from the second source, a third content item and a fourth content item;
   receiving a first command to output content corresponding to the first user account;
   determining, using first metadata associated with the first content item, first time information indicating when the first content item was made available;
   determining, using second metadata associated with the second content item, that the second content item was not previously played with respect to the first user account;
   determining, using third metadata associated with the third content item, that the third content item was previously played with respect to the first user account;
   determining, using fourth metadata associated with the fourth content item, that the fourth content item was not previously played with respect to the first user account;
   determining, based on the first metadata, the second metadata, the third metadata and the fourth metadata, a list of content responsive to the first command, the list including the second content item and the fourth content item; and
   causing a user device associated with the first user account to output the second content item and the fourth content item.

2. The method of claim 1, wherein receiving a command comprises:
   receiving first audio data from the user device;
   generating, using automatic speech recognition (ASR) processing, first text data representing the first audio data;

determining, using natural language understanding (NLU) processing, based on the first text data, that the first audio data corresponds to an intent to output content; and generating the first command using the first text data.

3. The method of claim 1, further comprising:

receiving from the first user account, an account date and time that indicates when the third content item was previously played with respect to the first user account;

determining that a fifth content item was made available after the account date and time; and causing the user device to play the fifth content item based on being made available after the account date and time.

4. The method of claim 3, further comprising:

determining time information indicating when a sixth content item of a group of content items was output with respect to the first user account;

determining that the time information occurs after the account date and time;

generating text data representing an inquiry as to whether outputting of content should continue;

generating inquiry audio data by applying text-to-speech processing to the text data;

sending the inquiry audio data to the user device for playback;

receiving reply audio data that represents a reply to the inquiry; and continuing, based on the reply, to cause the user device to output content items from the group of content items.

5. The method of claim 1, further comprising:

receiving first audio data from the user device;

generating voice identification vector data from the first audio data;

generating comparison data by processing the voice identification vector data with respect to stored vector data associated with the first user account;

determining a first speaker identification profile using the comparison data;

retrieving content metadata corresponding to the first user account and content items; and determining to output the content items, based on the content metadata.

6. The method of claim 1, further comprising:

storing fifth metadata associated with the second content item that indicates the second content item was output with respect to the first user account.

7. The method of claim 1, wherein determining a first user account comprises:

receiving biometric data from the user device;

analyzing the biometric data by comparing the biometric data to stored biometric data corresponding to the first user account that is associated with the user device; and identifying the first user account based on a comparison of the biometric data to the stored biometric data.

8. The method of claim 1, further comprising:

receiving second audio data from the user device;

determining a second command to output content;

processing the second audio data to determine a second speaker identification profile associated with a second user account;

determining, using fifth metadata associated with the first content item, that the first content item has not been previously output with respect to the second user account; and causing the user device to output the first content item, wherein a first utterance represented in the first command is the same as a second utterance represented in the second command.

9. The method of claim 1, further comprising:

determining to output content from the first source prior to content from the second source; and causing the user device to output the second content item prior to the fourth content item.

10. A system comprising:

memory; and at least one processor operable to:

determine a first source and a second source enabled to provide content with respect to a first user account and a second user account;

determine, from the first source, a first content item;

determine, from the second source, a second content item;

receive a first command to output content;

determine, using first metadata associated with the first content item, first time information indicating when the first content item was made available;

determine, using second metadata associated with the second content item, second time information when the second content item was made available;

determine, using the first time information and the second time information, to output the second content item prior to the first content item based on the second content item being made available after the first content item;

cause a user device associated with the first user account to output the second content item based on the first metadata and the second metadata;

cause the user device to output the first content item based on the first metadata and the second metadata;

receive audio data from the user device;

determine that the audio data represents a second command to output content;

process the audio data to determine a speaker identification profile associated with the second user account;

receive third metadata that indicates the first content item has not been previously output with respect to the second user account; and cause the user device to output the first content item based on the third metadata.

11. The system of claim 10, wherein the at least one processor is further operable to:

receive first audio data from the user device;

generate, using automatic speech recognition (ASR) processing, first text data representing the first audio data;

determine, using natural language understanding (NLU) processing, based on the first text data, that the first audio data corresponds to an intent to output content; and generate the first command using the first text data.

12. The system of claim 10, wherein the at least one processor is further operable to:

receive from the first user account, an account date and time that indicates when a third content item was output with respect to the first user account;

determine a fourth content item was added to the user device after the account date and time; and cause the user device to play the fourth content item based on being added after the account date and time.

13. The system of claim 12, wherein the at least one processor is further operable to:

determine a second date and time indicating when a fifth content item of a group of content items was output;

determine that the second date and time occurs after the account date and time;

generate text data representing an inquiry as to whether outputting of content should continue;

generate inquiry audio data by applying text-to-speech processing to the text data;

send the inquiry audio data to the user device for playback;

receive reply audio data that represents a reply to the inquiry; and continue, based on the reply, to cause the user device to output content items from the group of content items.

14. The system of claim 10, wherein the at least one processor is further operable to:

receive second audio data from the user device;

generate a voice identification vector data from the second audio data;

generate comparison data by processing the voice identification vector data with respect to stored vector data associated with the first user account;

determine a first speaker identification profile using the comparison data;

retrieve content metadata corresponding to the first user account and content items; and determine to output the content items based on the content metadata.

15. The system of claim 10, wherein the at least one processor is further operable to:

store third metadata associated with the first content item that indicates the first content item was output for the first user account.

16. The system of claim 10, wherein the at least one processor is further operable to:

receive biometric data from the user device;

analyze the biometric data by comparing the biometric data to stored biometric data stored corresponding to the first user account that is associated with the user device; and identify the first user account based on a comparison of the biometric data to the stored biometric data.

* * * * *